US011488167B2

(12) United States Patent
Shimizu et al.

(10) Patent No.: US 11,488,167 B2
(45) Date of Patent: Nov. 1, 2022

(54) BIOMETRIC AUTHENTICATION PAYMENT SYSTEM, PAYMENT SYSTEM, AND CASH REGISTER SYSTEM

(71) Applicant: MAXELL, LTD., Kyoto (JP)

(72) Inventors: Hiroshi Shimizu, Kyoto (JP); Yasunobu Hashimoto, Kyoto (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 16/635,721

(22) PCT Filed: Aug. 2, 2017

(86) PCT No.: PCT/JP2017/027983
§ 371 (c)(1),
(2) Date: Jan. 31, 2020

(87) PCT Pub. No.: WO2019/026196
PCT Pub. Date: Feb. 7, 2019

(65) Prior Publication Data
US 2021/0133755 A1     May 6, 2021

(51) Int. Cl.
*G06Q 20/40*     (2012.01)
*G06Q 20/32*     (2012.01)

(52) U.S. Cl.
CPC ... *G06Q 20/40145* (2013.01); *G06Q 20/3278* (2013.01)

(58) Field of Classification Search
None
See application file for complete search history.

(56) References Cited

U.S. PATENT DOCUMENTS 9,870,559 B2 * 1/2018 Pitroda ................. G16Z 99/00
2003/0061172 A1 * 3/2003 Robinson ......... G06Q 20/40145
705/67

(Continued)

FOREIGN PATENT DOCUMENTS

JP    2006-092491 A    4/2006
JP    2008-059356 A    3/2008

(Continued)

OTHER PUBLICATIONS

International Search Report issued in International Application No. PCT/JP2017/027983, dated Oct. 24, 2017, with English translation.

*Primary Examiner* — Bruce I Ebersman
*Assistant Examiner* — Matthew Cobb
(74) *Attorney, Agent, or Firm* — McDermott Will & Emery LLP

(57) ABSTRACT

In payment using biometric authentication, a customer-friendly technology with a high degree of freedom for customers to select a payment destination is provided. The present invention provides a biometric authentication payment system including: a biometric information acquisition device that acquires biometric information of a customer; a reception section that receives designation of a payment system of a payment destination; a transmission section that transmits the biometric information and a payment amount to the payment system; an authentication section that performs authentication using the transmitted biometric information, and a payment section that performs the payment of the payment amount when the authentication result is successful in authentication, and when a payment destination is designated.

20 Claims, 28 Drawing Sheets

(56) References Cited

U.S. PATENT DOCUMENTS

| | | |
|---|---|---|
| 2009/0138367 A1 | 5/2009 | Okawa |
| 2010/0082444 A1* | 4/2010 | Lin ..................... G06Q 20/204 235/383 |
| 2012/0240195 A1* | 9/2012 | Weiss ................. H04L 63/0853 726/4 |
| 2013/0114865 A1* | 5/2013 | Azar ....................... G06F 21/40 382/118 |
| 2016/0019543 A1* | 1/2016 | Taylor, III ........... H04L 63/083 705/44 |
| 2016/0253699 A1* | 9/2016 | Liu .................... G06Q 30/0244 705/14.43 |
| 2016/0335617 A1* | 11/2016 | Novack ............... G06Q 20/202 |
| 2016/0379219 A1 | 12/2016 | Ariga |
| 2018/0308101 A1* | 10/2018 | Valencia ......... G06K 19/07739 |
| 2019/0287110 A1* | 9/2019 | Brown ................ H04L 63/0876 |
| 2020/0410500 A1* | 12/2020 | Dorogusker ........... G06Q 20/20 |

FOREIGN PATENT DOCUMENTS

| | | |
|---|---|---|
| JP | 2010-009161 A | 1/2010 |
| JP | 2012-215918 A | 11/2012 |
| JP | 2013-117801 A | 6/2013 |
| JP | 2013-196317 A | 9/2013 |
| JP | 2016-181171 A | 10/2016 |

* cited by examiner

FIG. 2A

| ACCOUNT INFORMATION 310 | | | | | BIOMETRIC INFORMATION 312 |
|---|---|---|---|---|---|
| ACCOUNT ID 311 | PERSONAL IDENTIFICATION NUMBER 313 | CUSTOMER INFORMATION 314 | | PAYMENT AMOUNT INFORMATION 316 | |
| | | 315 | | | |

FIG. 2B

| ACCOUNT INFORMATION 310 | | | | | BIOMETRIC INFORMATION 312 |
|---|---|---|---|---|---|
| ACCOUNT ID 311 | PERSONAL IDENTIFICATION NUMBER 313 | CUSTOMER INFORMATION 314 | | PAYMENT AMOUNT INFORMATION 316 | |
| | | ADDRESS DATA 317 | 315 | | |

FIG. 2C

| ACCOUNT INFORMATION 310 | | | | | BIOMETRIC INFORMATION 312 |
|---|---|---|---|---|---|
| ACCOUNT ID 311 | PERSONAL IDENTIFICATION NUMBER 313 | CUSTOMER INFORMATION 314 | | PAYMENT AMOUNT INFORMATION 316 | |
| | | FAVORITE STORE INFORMATION 318 | 315 | | |

FIG. 2D

| ACCOUNT INFORMATION | | | | | BIOMETRIC INFORMATION 312 | |
|---|---|---|---|---|---|---|
| ACCOUNT ID 311 | PERSONAL IDENTIFICATION NUMBER 313 | CUSTOMER INFORMATION 314 | | PAYMENT AMOUNT INFORMATION 316 | VERIFICATION FACE IMAGE 312a | UPDATE DATE AND TIME 312b |
| | | | 315 | 310 | | |

FIG.24
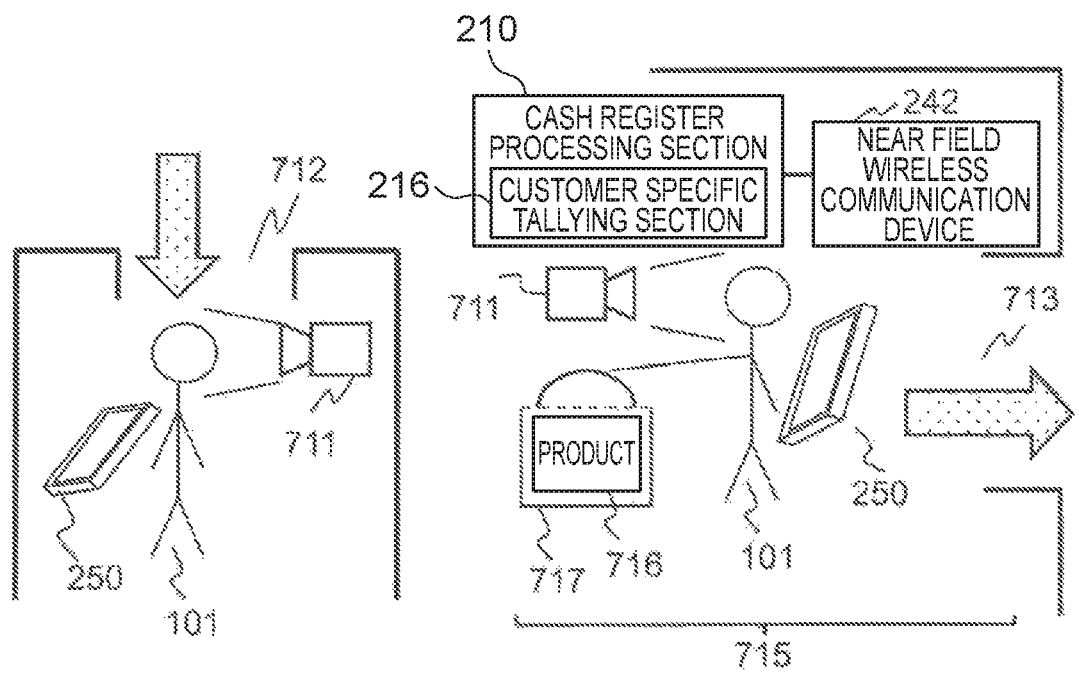
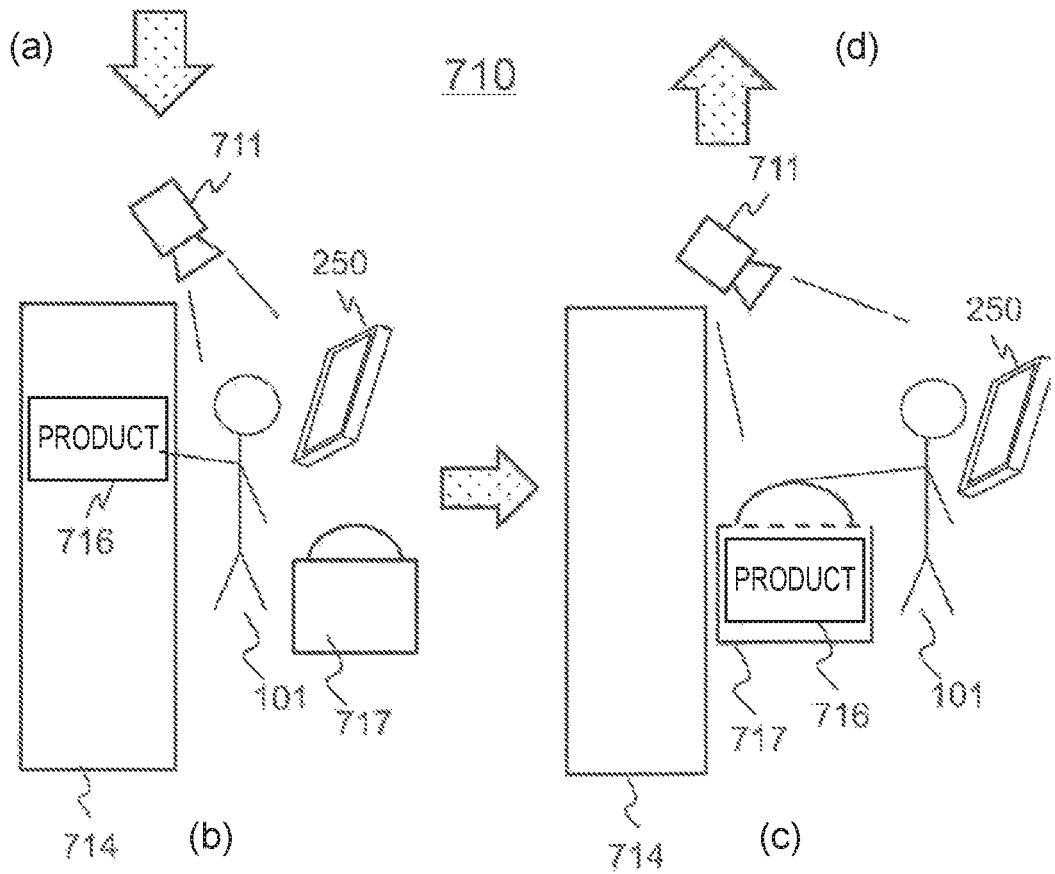

BIOMETRIC AUTHENTICATION PAYMENT SYSTEM, PAYMENT SYSTEM, AND CASH REGISTER SYSTEM

CROSS-REFERENCE TO RELATED APPLICATIONS

This application is the U.S. National Phase under 35 U.S.C. § 371 of International Application No. PCT/JP2017/027983, filed on Aug. 8, 2017, of which the entire content is hereby incorporated by reference.

TECHNICAL FIELD

The present invention relates to a payment technique using biometric authentication.

BACKGROUND ART

When making a credit card payment at a store, there is a need to present a credit card and enter a PIN (Personal Identification Number) code, which is troublesome. As a technique for avoiding the above operation, there is a technique for performing payment using biometric authentication such as face authentication. For example, Patent Literature 1 discloses a technique that "a credit card company system sends a house card to a member store instead of a customer based on a house card issuance request from the customer who has been introduced by the member store. On the member store side, a terminal of the member store includes regular customer visit notification means for notifying a store interior of a customer visit upon confirming the customer visit from at least any one visit confirmation means such as an entry permitted by a store clerk, a conversation including secret words between the customer and the store clerk, a customer mobile terminal ID authentication, and customer biometric authentication, and payment means for performing a bill for customer payment with the use of the house card stored on the store side on the condition that the customer visit is notified by the regular customer visit notification means (abstract excerpt).

CITATION LIST

Patent Literature

PATENT LITERATURE 1: JP-A No. 2012-215918

SUMMARY OF INVENTION

Technical Problem

In the technique disclosed in Patent Literature 1, a user can pay smartly without presenting the house card. However, the card to be used is limited to one kind of house card of the store newly issued on the spot. In other words, the customer cannot pay with a credit card held by the customer. Furthermore, recently, the customer has multiple types of credit cards and uses those credit cards properly according to the store, purchased products, and various situations. Also, the store side has partnered with multiple credit card companies to meet customer demands. However, Patent Literature 1 does not consider such a situation at all. Therefore, the degree of freedom of the customer's choice of payment destination is low.

The present invention has been made in view of the above circumstances, and an object of the present invention is to provide a customer friendly technology with a high degree of freedom for a customer to select a payment destination in a payment using a biometric authentication.

Solution to Problem

The present invention provides a biometric authentication payment system including: a biometric information acquisition device that acquires biometric information of a customer; a reception section that receives designation of a payment system of a payment destination; a transmission section that transmits the biometric information and a payment amount to the payment system; an authentication section that performs authentication using the transmitted biometric information, and a payment section that performs the payment of the payment amount when the authentication result is successful in authentication, and when a payment destination is designated.

In addition, the present invention provides a payment system for paying a payment amount in response to a payment request, including: an account DB that stores account information for each customer and biometric information in association with each other; an authentication section that authenticates the biometric information received from a cash register system of a store with reference to the account DB, and a permission section that permits the payment when the authentication result is successful in authentication.

Further, the present invention provides a cash register system that serves as an interface of payment for a product purchased by a customer at a store, including: a biometric information acquisition device that acquires biometric information of the customer, a reception section that receives a designation of a payment system of a payment destination; a transmission section that transmits the biometric information and a payment amount to a predetermined payment system; and a presentation section that receives an authentication result and a payment result, and presents the authentication result and the payment result to the customer.

Advantageous Effects of Invention

According to the present invention, the customer friendly technique with a high freedom degree of a customer's payment destination selection can be provided in the payment using biometric authentication. Problems, configurations, and effects other than those described above will be clarified by the following description of embodiments.

BRIEF DESCRIPTION OF DRAWINGS

FIG. 2A is an illustrative diagram illustrating an example of an account database according to the first embodiment, FIGS. 2B and 2C are illustrative diagrams illustrating an example of an account database according to a fifth embodiment, and FIG. 2D is an illustrative diagram illustrating an example of an account database according to a sixth embodiment.

FIG. 24 is an illustrative diagram illustrating an outline of a seventh embodiment.

DESCRIPTION OF EMBODIMENTS

Figure 1:
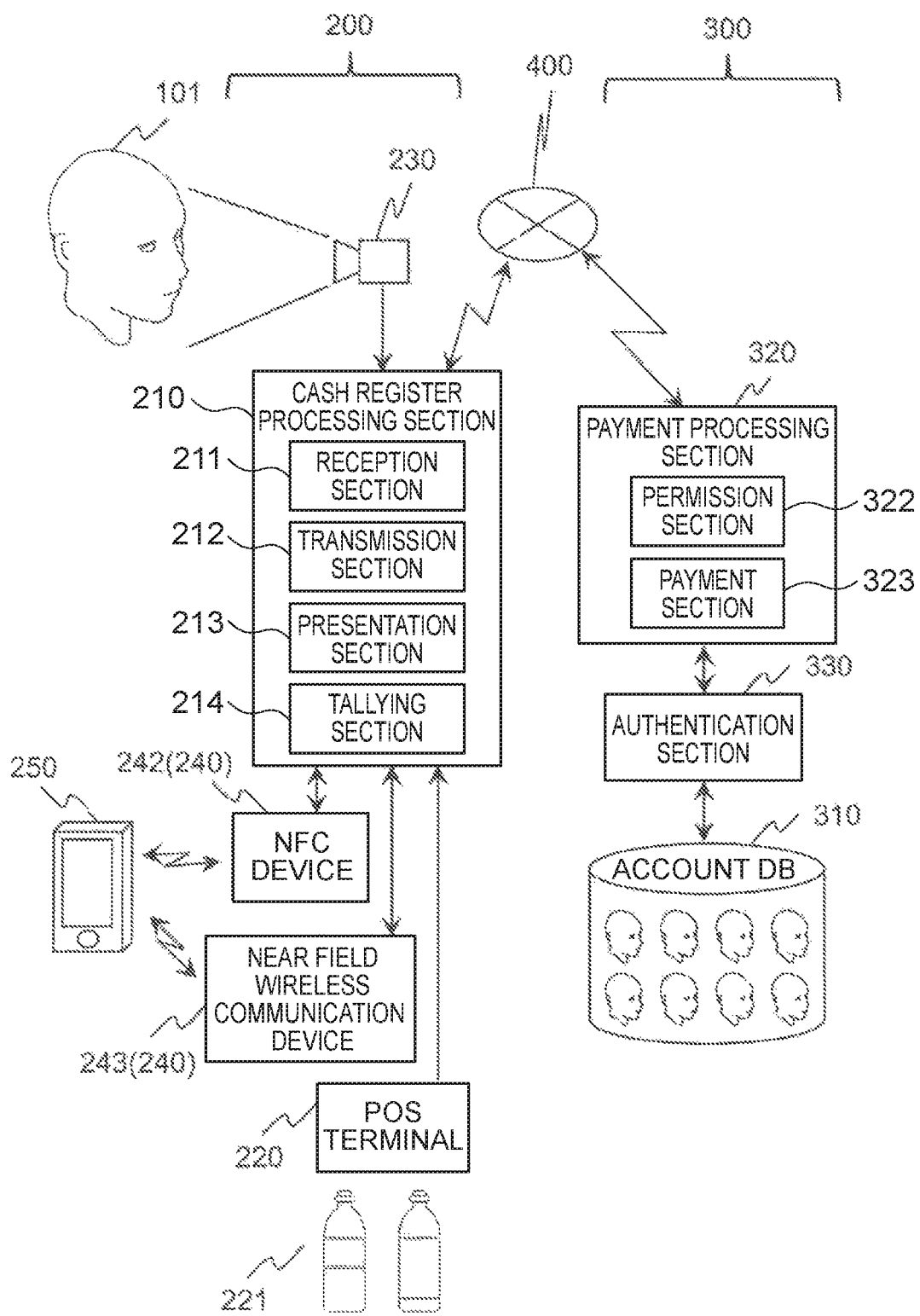
FIG. 1 is an illustrative diagram illustrating a system configuration of a biometric information authentication payment system according to a first embodiment.

Hereinafter, embodiments of the present invention will be described with reference to the drawings. Hereinafter, in the present specification, those having the same function are denoted by the same reference numerals unless otherwise identified, and a repeated description will be omitted.

First Embodiment

In a first embodiment of the present invention, biometric information of a customer is used to identify an account of a payment system such as a card company. In other words, at the time of payment at a store, the customer's biometric information is transmitted to the payment system, and it is determined whether or not the payment can be performed based on the biometric information, and the payment is performed. Hereinafter, in the present embodiment, an example in which a face image is used as the biometric information of the customer will be described.

FIG. 1 is a diagram illustrating a system configuration of a biometric authentication payment system 100 according to the present embodiment. As shown in the figure, the biometric information authentication payment system 100 of the present embodiment includes a cash register system 200 and a payment system 300. The cash register system 200 and the payment system 300 are connected to each other through a network 400 such as the Internet.

[Cash Register System]

The cash register system 200 is disposed in a store or the like, and functions as an interface for payment of a product purchased by a customer 101 in the store. In the present embodiment, the cash register system 200 transmits a payment amount of the customer 101 and biometric information of the customer 101 to the payment system 300, and performs a payment request to the payment system 300. Further, when the payment has been made, for example, the cash register system 200 issues a receipt or the like, and notifies the customer 101 of the completion of the payment. The cash register system 200 includes, for example, a cash register processing section 210, a POS (point of sale) terminal 220, a biometric information acquisition device 230, and a communication device 240.

The POS terminal 220 reads a barcode of a product 221 and transmits the read barcode to the cash register processing section 210.

The biometric information acquisition device 230 acquires a face image as the biometric information of the customer 101 and transmits the acquired face image to the cash register processing section 210. In the present embodiment, for example, a camera or the like is used as the biometric information acquisition device 230.

The cash register processing section 210 adds the amount of the product 221 of the customer 101, calculates a total amount, and presents the calculated total amount to the customer 101. The cash register processing section 210 makes a payment with the card selected by the customer 101. In the present embodiment, the cash register processing section 210 transmits the biometric information and the total amount (payment amount) to the payment system 300. In addition, upon receiving the notification of the payment completion from the payment system 300, the cash register processing section 210 notifies the customer of the payment completion. In the present embodiment, for example, the cash register processing section 210 issues a receipt or the like.

In order to realize the above processing, the cash register processing section 210 of the present embodiment includes a reception section 211, a transmission section 212, a presentation section 213, and a tallying section 214.

The tallying section 214 reads the amount managed in association with a product code for each product code transmitted from the POS terminal 220, and adds the read amount. The addition of the amount is performed after receiving an instruction to start reading until receiving an instruction to complete reading on the customer 101 basis. In addition, the product codes and the amounts are stored in association with each other in advance.

The reception section 211 receives a designation of the payment system 300 as a payment destination from the customer 101. Specifically, the reception section 211 receives a designation of the card company used for payment by the customer 101 from among the payment companies with which the store makes a contract and of which cards are held by the customer 101. In the present embodiment, there are a method of receiving selection and designation before authentication (hereinafter referred to as pre-selection) and a method of receiving selection and designation after authentication (hereinafter referred to as post-selection).

In the case of the pre-selection, the reception section 211 receives the designation of the payment destination from among the payment systems (contract payment systems) 300 of all payment companies with which the store makes a contract. In that case, for example, the reception section 211 generates a designation reception screen for receiving the designation of the contract payment system 300, presents the designation reception screen to the customer 101, and receives the designation from the customer 101.

In addition, in the case of the post-selection, the reception section 211 receives the designation of the payment destination from among the payment systems (approval payment systems) 300 from which a reply of the authentication success has been received in the contract payment systems 300. In that case, for example, the reception section 211 presents only information for identifying the approval payment system 300 on the designation reception screen, and receives the designation of the customer 101 from the presented information.

The transmission section 212 transmits the payment amount and the biometric information to a predetermined payment system 300.

In the case of the pre-selection, the transmission section 212 transmits the payment amount and the biometric information to the payment system 300 that the reception section 211 has received the designation from the customer 101.

On the other hand, in the case of the post-selection, the transmission section 212 transmits to all contract payment systems 300, the payment amount and the biometric information. Thereafter, the transmission section 212 transmits a payment request to the payment system 300 designated by the customer 101 through the reception section 211.

For example, depending on the payment company, there is a case in which an upper limit is set for the accumulated payment amount in a predetermined totaling period unit. In addition, the upper limit amount may vary depending on each customer 101. Therefore, even if the authentication of the biometric information is successful, the payment may not be permitted if the upper limit of the payment amount is exceeded. For that reason, in the present embodiment, the payment amount is transmitted even before authentication.

In the case where the above limitation is not present, at the time of the post-selection, the transmission section 212 may transmit to all the contract payment systems 300 only the biometric information before authentication, and transmit a payment request together with the payment amount to the payment system 300 whose authentication is successful and which is designated by the customer 101.

The presentation section 213 presents the authentication result and the payment result to the customer 101. When the payment is completed, the presentation section 213 prints out a receipt or the like.

The communication device 240 performs a near field communication with, for example, a mobile terminal 250 held by the customer 101. For example, the communication device 240 includes an NFC (near field communication) device 242, a near field wireless communication device 243, and so on.

[Payment System]

The payment system 300 is placed at a credit card company (payment company; card company) and performs a payment in response to a payment request transmitted from the cash register system 200 of the contracted store, and makes a response indicating of completion, unpaid or the like. The payment system 300 according to the present embodiment includes an account database (DB) 310 in which an account for each customer 101 is registered, a payment processing section 320, and an authentication section 330.

In the account DB 310, as shown in FIG. 2A, biometric information (face image in the present embodiment) 312 of the customer 101 is registered in association with account information 311. The account information 311 includes an account ID 313, a personal identification number 314, customer information 315, payment amount information 316, and the like. In the present embodiment, the account ID 313 includes a card ID (card number) of a credit card, for example. The personal identification number 314 is authentication information such as the personal identification number of the credit card, for example. The customer information 315 includes personal information such as debited bank account information, and an age, a sex, an address, a telephone number, and an email address of the customer 101. The payment amount information 316 includes, for example, the payment amount, and an upper amount at that time on each date and at each store of the payment request source.

The authentication section 330 authenticates the biometric information transmitted from the cash register system 200 through the payment processing section 320. In the present embodiment, the authentication section 330 sequentially verifies the biometric information transmitted from the cash register system 200 against the biometric information 312 registered in the account DB 310, and if there is matching biometric information, the authentication is successful. At that time, the authentication section 330 identifies information identifying a record having the matched biometric information 312, for example, the account ID 313 of the record. If those pieces of biometric information do not match with each other, authentication is unsuccessful.

The payment processing section 320 receives the payment request from the cash register system 200, and returns the result to the payment request transmission source. In order to realize the above processing, the payment processing section 320 according to the present embodiment includes a permission section 322 and a payment section 323.

When the authentication section 330 succeeds in authentication, the permission section 322 determines whether or not the payment is enabled. Specifically, the permission section 322 compares the upper limit amount of the account ID 313 identified in the authentication section 330 with the payment amount, and if the payment amount is within the upper limit amount, the permission section 322 transmits information that permits the payment to the cash register system 200 of the transmission source. In other cases, the permission section 322 transmits information indicating that payment is disabled.

The payment section 323 pays the payment amount of the customer 101 according to the payment request. In the case of pre-selection, if the permission section 322 permits the payment, the payment section 323 performs the payment. In the case of the post-selection, after the payment request has been received, the payment section 323 performs the payment. In the present embodiment, for example, the payment section 323 adds the payment amount to the payment amount information 316 of the account ID 313 identified by the authentication section 330. In addition, the payment section 323 adds together with the payment amount, information identifying the transmission source cash register system 200, a date, and the like.

Figure 3A:
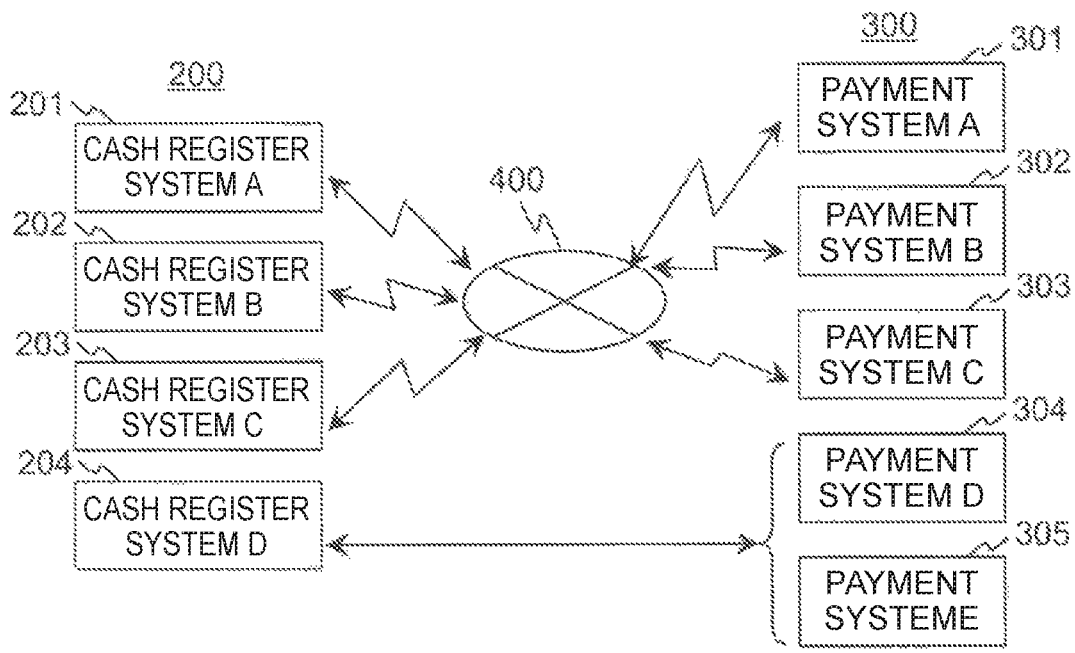
FIG. 3A is an illustrative diagram illustrating a connection relationship of each configuration according to the first embodiment.

FIG. 1 illustrates the case in which there is one cash register system 200 and one payment system 300, but the number of the cash register system 200 and the payment system 300 is not limited. For example, as shown in FIG. 3A, multiple cash register systems 200 and multiple payment systems 300 may be provided. Further, the cash register system 200 and the payment system 300 may be connected directly to each other through no network.

[Biometric Information Authentication Payment System]

FIG. 3A is a diagram illustrating a connection relationship between the cash register system 200 and the payment system 300 in the present embodiment.

The cash register system 200 is located for each store in each place. As an example, a store system A 201, a store system B 202, a store system C 203, and a store system D 204 are shown. Among those store systems, the store system A 201, the store system B 202, and the store system C 203 are connected to a payment system A 301, a payment system B 302, and a payment system C 303, respectively, through the network 400.

At this time, a plurality of cash register systems 200 may be connected to the same payment system 300. Further, one cash register system 200 may be connected to a plurality of payment systems 300 so that the customer can select any payment system 300 as a payment method at the time of payment. The latter has, for example, the same meaning as a method to select the credit card used in the payment for use in the payment.

Also, as in the store system D 204, the store system may be placed as a local system connected directly to the payment system D 304 and the payment system E 305 through no network 400. In the case of the local system, when a member is registered in the payment system D 304 or the payment system E 305, the payment may be pooled in advance by prepaid or the like, and the payment may be made in the local system every time a product is purchased. In the case of the local system, since the network 400 is not used, a system capable of reducing a risk such as unauthorized use of a credit card can be configured.

[Credit Card Payment System]

Figure 4:
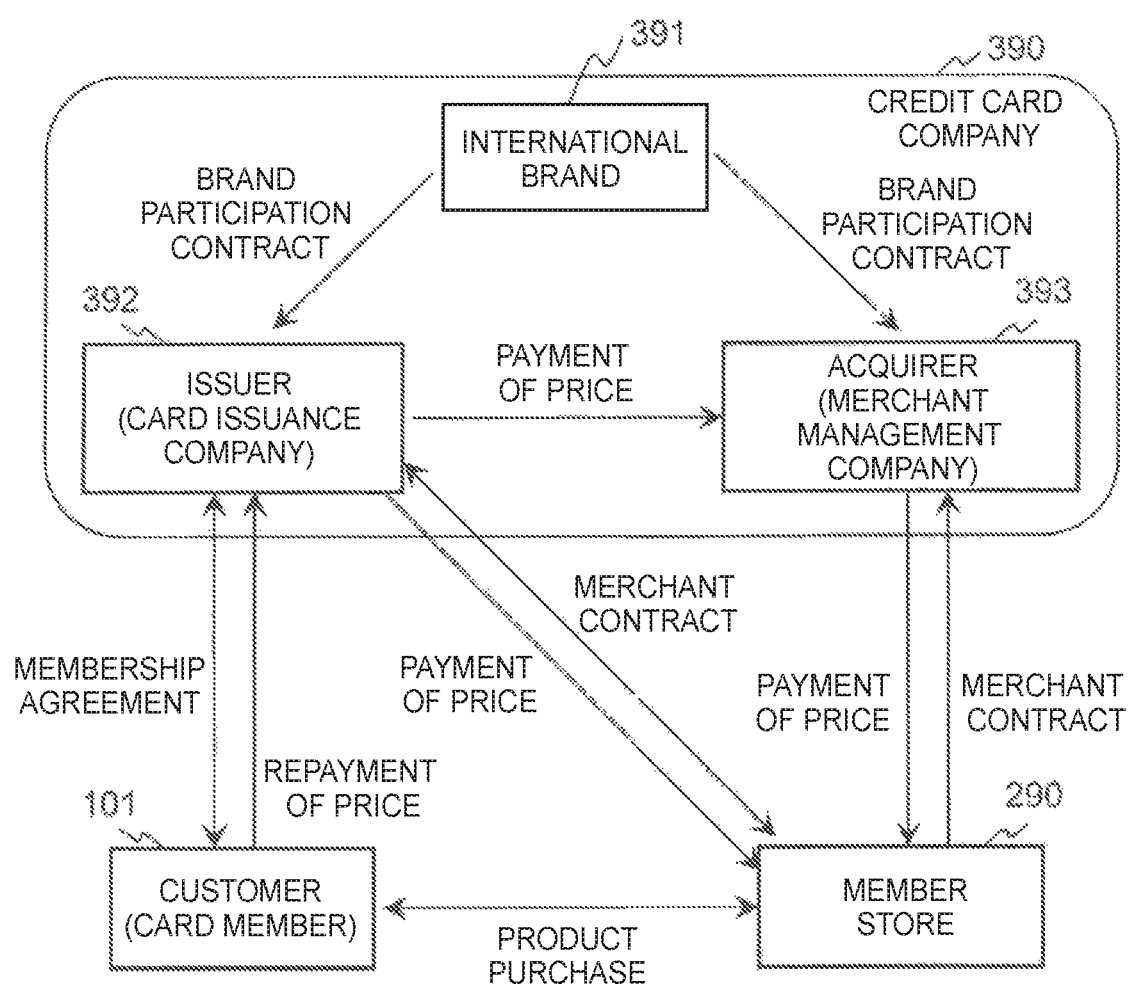
FIG. 4 is an illustrative diagram illustrating a relationship between a credit card company, a card member, and a member store.

FIG. 4 is a diagram illustrating a relationship in the payment by a general credit card, between a credit card company (payment company), a card member who is the customer 101, and a member store which is a store.

A credit card company 390 includes a plurality of international brands 391, an issuer 392 to issue a card by using the international brands, and an acquirer 393 that carries out the cultivation and management of the member stores.

The international brand 391 carries out a brand participation agreement with, for example, the issuer 392 such a bank and the acquirer 393. Under the agreement, the issuer 392 and the acquirer 393 can issue a card of international brand 391.

The customer 101 exchanges a membership contract with the issuer 392 to hold a credit card as a card member.

In addition, a member store 290 exchanges a merchant contract with the issuer 392, thereby being capable of accepting the credit card payment at the store.

The member store 290 which has exchanged the merchant contract with the issuer 392 makes a payment as follows. The customer 101 makes a purchase of a product by the credit card at the member store 290. When the member store 290 notifies the issuer 392 that the customer 101 has purchased the product, the issuer 392 pays a price to the member store 290 on behalf of the customer 101 who is a card member. Then, the customer 101 repays the price to the issuer 392 in a method such as a single payment or an installment payment. This completes the purchase of the product using the credit card and the payment of the price.

The same applies a case in which the member store 290 makes a merchant contract with the acquirer 393. In other words, the member store 290 notifies the acquirer 393 that the customer 101 has made the purchase by the credit card. In response to this notification, the acquirer 393 pays the member store 290 on behalf of the customer 101 who is a card member. Then, the customer 101 repays the price in a method such as a single payment or an installment payment. In this case, since the customer 101 has exchanged the card member contract with the issuer 392, the price is paid from the customer 101 to the issuer 392. The issuer 392 pays the price to the acquirer 393. As a result, the purchase of the product and the payment of the price using the credit card are completed.

In the present embodiment, the functions of the payment system 300 are realized by being appropriately shared by the international brand 391, the issuer 392, and the acquirer 393. In addition, the cash register system 200 is provided in the member store 290.

[Hardware Configuration]

Figure 5:
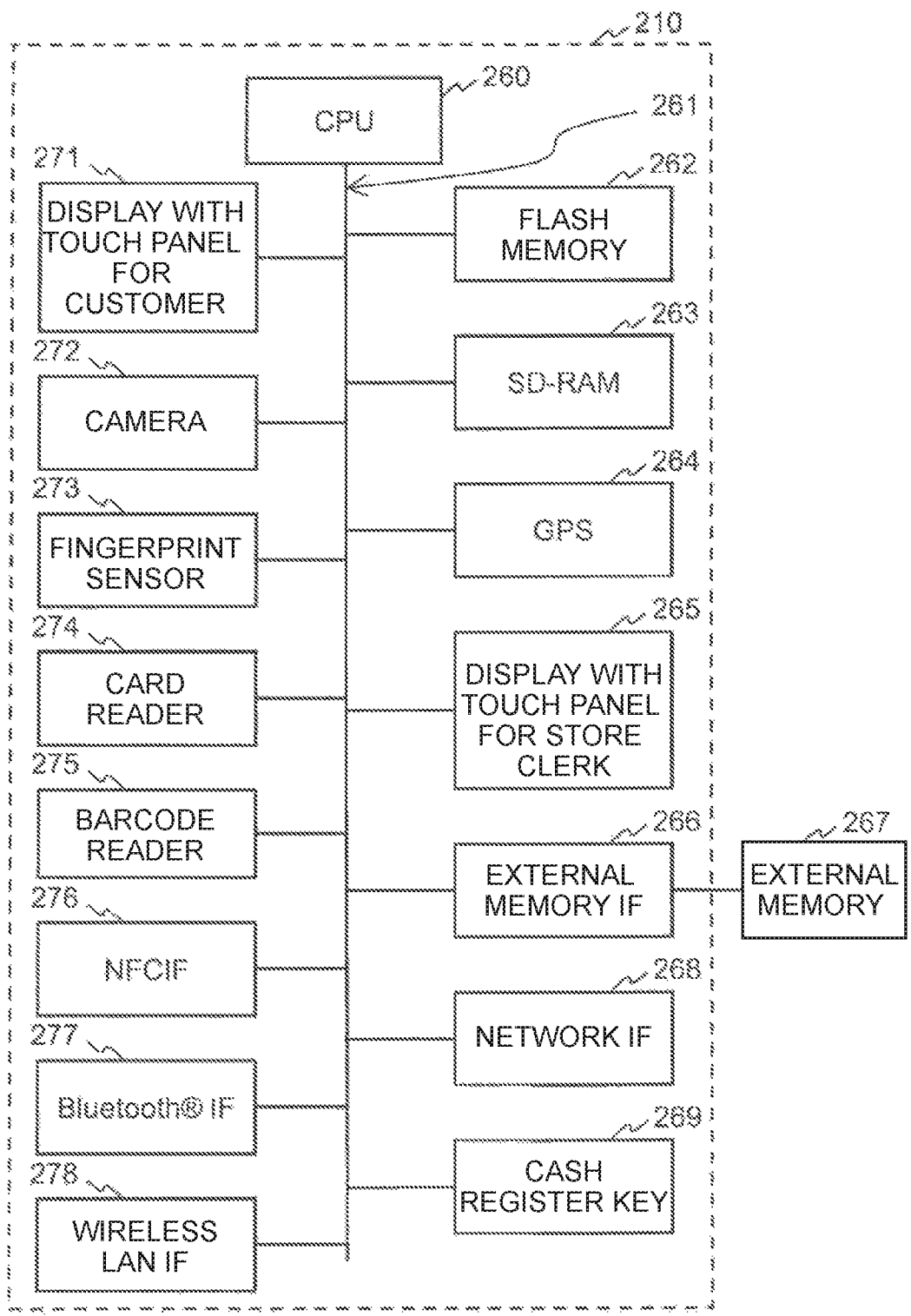
FIG. 5 is a diagram of a hardware configuration of a cash register system according to the first embodiment.

Next, the hardware configuration of the cash register system 200 according to the present embodiment will be described. FIG. 5 is a diagram illustrating a hardware configuration of the cash register system 200 according to the present embodiment.

The cash register system 200 includes a CPU 260, a bus 261, a flash memory 262, an SD-RAM 263, a GPS 264, a first display 265, an external memory interface (IF) 266, a network IF 268, a cash register key 269, a second display 271, a camera 272, a card reader 274, a barcode reader 275, an NFCIF 276, a near field wireless communication IF 277, and a wireless LANIF 278.

The bus 261 extends from the CPU 260, and hardware that is controlled by the CPU 260 and acquires information is connected to the bus 261. The external memory IF 266 is connected to an external memory 267, and the CPU 260 accesses the external memory 267 through the external memory IF 266.

Each of the above functions is realized by the CPU 260 expanding and executing the programs stored in the external memory 267 and the flash memory 262 in the SD-RAM 263.

The second display 271 is a display with a touch panel for the customer 101. The second display 271 is installed facing the customer 101 side, displays the tallying result (total amount, payment amount) at the time of purchasing a product, and displays a selectable payment company (payment system 300). Also, the second display 271 accepts the selection by the customer 101 from the display.

The card reader 274 reads information attached to a credit card or a debit card.

The camera 272 is the biometric information acquisition device 230 described above, and captures a face of the customer 101 and acquires a face image.

The camera 272 may be a general camera for capturing the customer's face, that is, a camera for capturing a color image in a visible light band. The camera 272 may be various type cameras, for example, a camera for capturing an infrared light band, and a TOF type camera for capturing both a visible light band and an infrared light band while projecting infrared rays, and acquiring a distance to a subject in pixel unit.

In particular, in the case of the camera of the infrared ray band, in order to uniform a positional relationship between the customer 101 and the camera, the lighting conditions at the time of capturing an image, and the like, it is desirable that a verification face image to be registered on the payment system 300 side is also captured in the vicinity of the cash register processing section 210. Since the image is captured at the store, for example, a spoofing purchase caused by acquiring a selfie posted to a general SNS and posting the selfie to the biometric information acquisition device 230 can be prevented.

In addition, in the case of using the TOF type camera that acquires a distance to a subject in pixel units, the uneven shape of the face can be used as biometric authentication information. Therefore, for example, the spoofing using a photograph of the customer 101 can be prevented.

In addition, in the case of using the camera of the infrared ray band, information that can be captured only with a store camera such as a subcutaneous capillary pattern on the face is used. For that reason, information that is more difficult to reproduce can be used for authentication, and security can be further improved.

Further, the biometric information acquired by the camera 272 is not limited to the face. For example, the biometric information may be a full-length image, a limb, or a body of the customer. In addition, the authentication method may be a method of making the determination based on a ratio of the size of the component parts of the face. In other words, any biometric information that can be recognized by being captured with a camera may be used.

Incidentally, as hardware to implement the biometric information acquisition device 230, not only the camera 272, but also a device for acquiring other biometric information such as a fingerprint sensor 273 may be provided, for example. In addition, a device for acquiring the biometric information such as a palm print and an iris may be provided. An active authentication operation by the customer such as the presentation of a fingerprint or a palm print on a scanner, or peeping into a measuring device in the case of iris authentication, may be required.

The barcode reader 275 is the POS terminal 220 described above, which reads a barcode attached to the product 221, and acquires data necessary for identifying the price of the product 221.

The NFCIF 276, the near field wireless communication IF 277, and the wireless LANIF 278 are the communication device 240 described above. The NFCIF 276 corresponds to a service using a non-contact IC chip such as electronic money mounted on the mobile terminal 250 such as a smartphone. The near field wireless communication IF 277 is an interface of the near field wireless communication, which reads the ID of the mobile terminal 250 in the range of about a radius of several m, and performs a two-way communication. As a communication standard, for example, Bluetooth (registered trademark) or the like is used. As with the near field wireless communication IF 277, the wireless LANIF 278 performs a wireless communication with the mobile terminal 250 and the like in a wide range such as in a store.

The flash memory 262 is a nonvolatile memory that stores a program for operating the cash register system 200, constants to be held at all times, and the like.

The SD-RAM 263 is a work area of the program in the operation of the cash register system 200.

The GPS 264 measures an absolute position of the cash register system 200 on the earth. For example, the GPS 264 is used in the case of a mobile store that moves by car or the like.

The first display 265 is a display with a touch panel for a store clerk. The first display 265 is used when the store clerk visually confirms the sum of product prices, or when the product has no barcode, and a product list is displayed on the display for selection.

The external memory IF 266 is an I/F with the detachable external memory 267, and used to take out an operation log of the cash register system 200 to the external, or to enter software for updating a program of the cash register system 200.

The network IF 268 connects the cash register system 200 to the network 400. The cash register system 200 is connected to the payment system 300 through the network IF 268. In other words, the network IF 268 realizes the transmission section 212.

The cash register key 269 has a function of a start switch of the cash register system 200. The cash register system 200 operates only when a dedicated key is basically inserted into the cash register key 269. When there is no key, the cash register system 200 may be a system in which the cash register processing section 210 may not operate at all, or reads an operation confirmation or a log and can operate only a portion not related to money such as software update.

The payment system 300 has basically the same hardware configuration as the cash register system 200. In other words, the payment system 300 includes at least a CPU, a memory, a storage device, and a communication interface. Then, the functions of the payment system 300 are realized by allowing the CPU to load the program stored in the storage device in advance in the memory. The account DB 310 is stored in the storage device or the like.

[Designation Reception Screen]

Figure 6A:
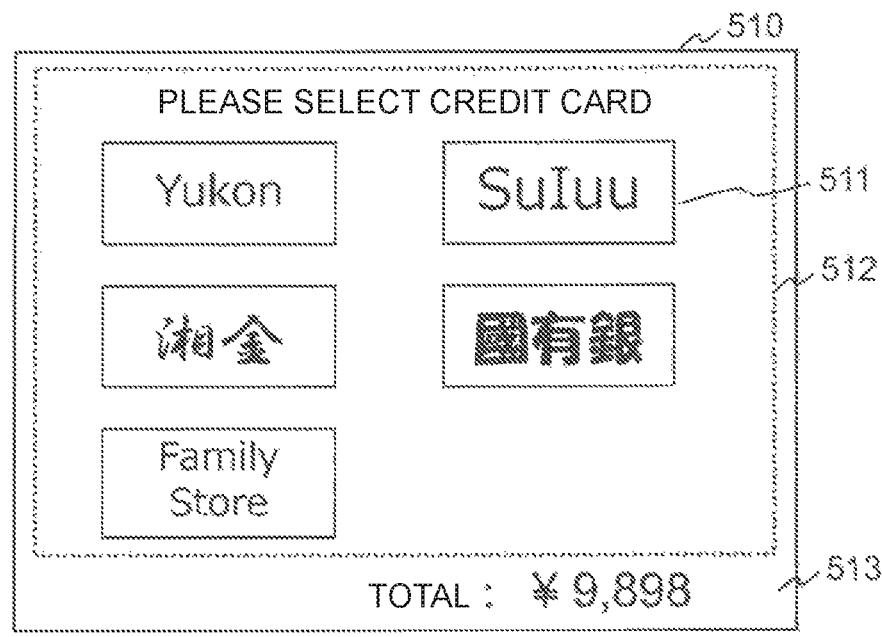
FIG. 6A is an illustrative diagram illustrating a designation reception screen according to the first embodiment.

A designation reception screen 510 displayed on the second display 271 when the reception section 211 receives selection and designation from the customer 101 will be described. FIG. 6A shows an example of the designation reception screen 510.

First, the designation reception screen 510 in the case of pre-selection will be described. The reception section 211 generates screen data of the designation reception screen 510 with the use of data stored in advance according to an instruction from a cashier, and displays the screen data on the second display 271. The screen data includes, for example, a payment destination list 512 to display a list of the payment destination, and a payment amount 513.

The payment destination list 512 displays information (identification information) 511 that can identify each of the contract payment systems 300 side by side. The identification information 511 is, for example, a logo of a payment company that holds each payment system 300. The identification information 511 is stored in the flash memory 262 or the external memory 267 in advance.

Figure 6B:
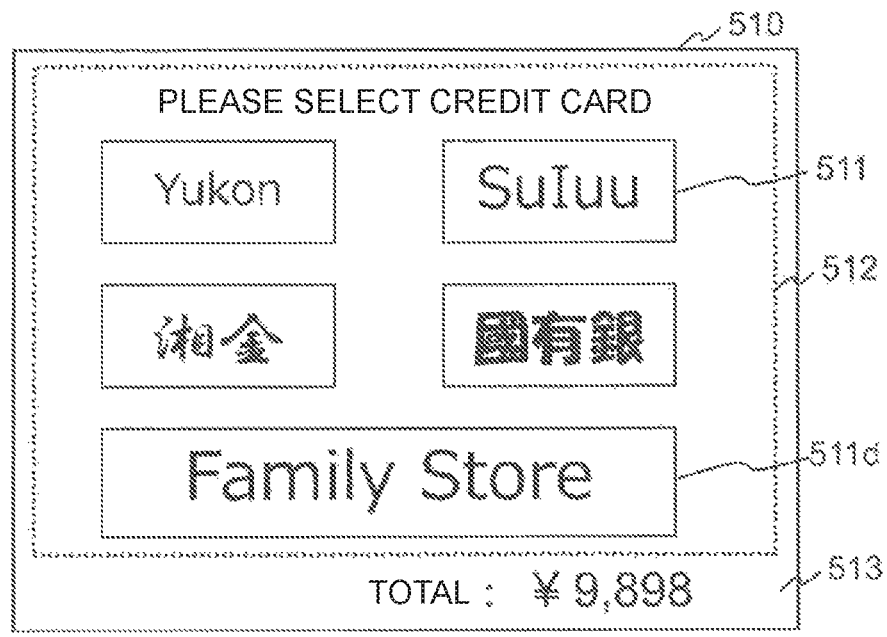
FIG. 6B is an illustrative diagram illustrating a modification of the designation reception screen.

In the present embodiment, a default payment destination may be set in advance. The default payment destination is the payment system 300 automatically designated when the customer 101 does not select the payment system 300. In that case, the identification information 511d of the payment destination of the default may be displayed in a manner that can be identified from the identification information 511 of another payment system 300. An example of FIG. 6B shows a case in which a display size of identification information 511d of the payment destination of the default is set to be larger than a display size of the identification information 511 of another payment system 300.

In the case of post-selection, only the identification information 511 of the contract payment system 300 that has been successfully authenticated is displayed as the payment destination list 512 on the designation reception screen 510.

The customer 101 touches a button including the identification information 511 displayed on the second display 271 to select a desired payment destination. As a result, the reception section 211 accepts the selection of the payment destination by the customer 101.

[Flow of Payment Process: Pre-Selection]

Figure 7:
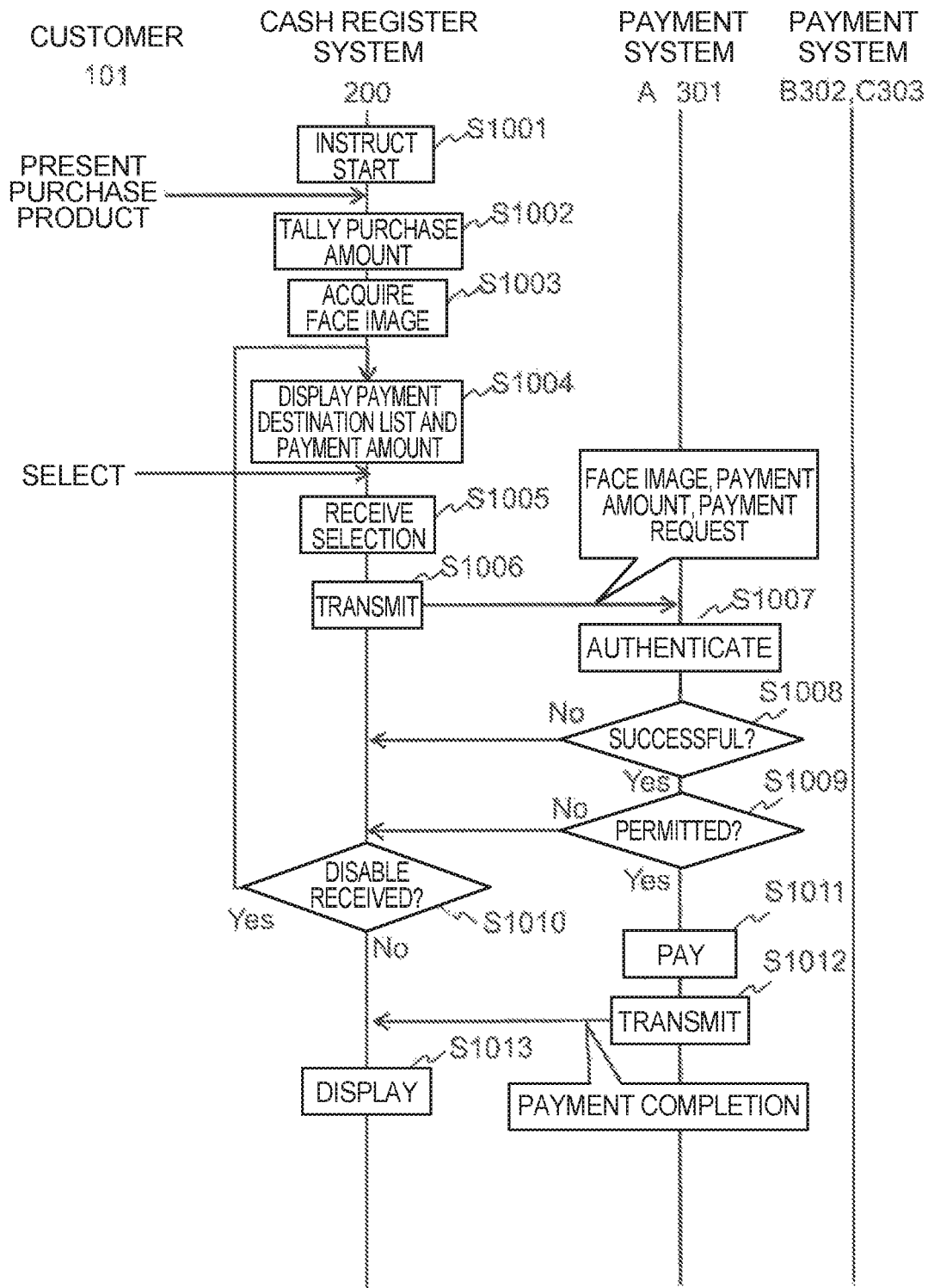
FIG. 7 is a flowchart of a payment process before selection according to the first embodiment.

Next, a flow of a payment process in the biometric authentication payment system 100 will be described. FIG. 7 is a diagram illustrating a flow of a pre-selected payment process according to the present embodiment.

When the order of the customer 101 is reached, the cashier instructs the cash register processing section 210 to start inputting a purchased product of the customer. Upon accepting a start instruction (Step S1001), the cash register processing section 210 acquires the amount of money of a product code transmitted from the POS terminal 220, and adds the amount until receiving an indication of termination. Upon receiving a termination instruction from the cashier, the cash register processing section 210 tallies the purchase amount (step S1002).

On the other hand, after the start instruction, the cash register processing section 210 instructs the biometric information acquisition device 230 to acquire a face image of the customer 101. In response to the instruction, the biometric information acquisition device 230 acquires the face image of the customer 101 (step S1003) and transmits the acquired face image to the cash register processing section 210.

Next, the presentation section 213 displays the designation reception screen 510 on the second display 271 together with the payment destination list 512, using the total purchase amount as the payment amount (step S1004).

The cashier presents the second display 271 to the customer 101 and prompts the user to select a payment destination. The customer 101 selects the payment destination from the identification information 511 displayed as the payment destination list 512.

When the reception section 211 receives the selection of the payment destination from the customer 101 (Step S1005), the transmission section 212 transmits the payment amount, the face image, and a payment request to the payment system 300 corresponding to the selected identification information 511 (Step S1006). In FIG. 7, it is assumed that the payment destination having the payment system A 301 is selected from the payment systems A 301, B 302, and C 303.

In the payment system A 301 that has received the transmitted payment amount and face image, the authentication section 330 first verifies the transmitted face image against the verification face image in the account DB 310 for authentication (Step S1007). If the authentication is unsuccessful, the authentication section 330 transmits a response indicating unsuccessful authentication to the cash register system 200 of the transmission source (Step S1008).

On the other hand, if the authentication is successful, the permission section 322 determines the propriety of the payment (Step S1009). If payment is disabled, the permission section 322 transmits a response indicating that payment is disabled to the cash register system 200 of the transmission source.

In the cash register system 200 that has received a reply indicating that authentication is unsuccessful or the payment is disabled (step S1010), the process returns to Step S1004, and the presentation section 213 displays the designation reception screen 510 again and waits for selection. At this time, the payment system A 301 for which the payment has not been permitted is excluded from the payment destination list 512 to be displayed. Incidentally, when receiving a reply that the payment is disabled, presentation section 213 may display a message indicating that the payment is disabled in the second display 271.

On the other hand, if the payment is enabled, the payment section 323 performs the payment (Step S1011), and transmits a response indicating the completion of payment to the cash register system 200 of the transmission source (Step S1012).

In the cash register system 200, the presentation section 213 displays on the second display 271 that the payment has been completed (Step S1013), and terminates a merchandise purchase sequence.

Further, when receiving a notification that the payment is disabled from all the contract payment systems 300, the presentation section 213 notifies the customer 101 of that effect, and terminates this processing.

Incidentally, the image face may be acquired at any timing as long as the timing is from the start instruction in Step S1001 to the transmission in Step S1006.

If the default payment destination is set, in Step S1004, the presentation section 213 displays the payment destination list 512 with the default payment destination identified. When receiving no instruction of selection from the customer 101 for a predetermined period, the reception section 211 may be configured to determine that the payment destination of the default has been selected.

[Flow of Payment Process: Post-Selection]

Next, a flow of the payment process in the case of post-selection will be described with reference to FIG. 8.

The cashier instructs the cash register processing section 210 to start inputting the purchased product of the customer. Upon receiving a start instruction (Step S1101), the cash register processing section 210 acquires the amount of money of the product code transmitted from the POS terminal 220 and adds the amount until receiving an instruction of termination. Upon receiving the termination instruction from the cashier, the cash register processing section 210 tallies the purchase amount (Step S1102).

On the other hand, after the instruction to start, the cash register processing section 210 instructs the biometric information acquisition device 230 to acquire the face image of the customer 101. In response to the instruction, the biometric information acquisition device 230 acquires the face image of the customer 101 (Step S1103) and transmits the acquired face image to the cash register processing section 210.

Upon termination of the tallying, the transmission section 212 transmits the acquired face image and payment amount to all the contract payment systems 300 (Step S1104).

In each payment system 300 that has received the face image, the authentication section 330 performs authentication (Step S1105). Then, if authentication is unsuccessful, the authentication section 330 returns a fact that the authentication is unsuccessful to the cash register system 200 of the transmission source (Step S1106). In that case, nothing needs to be returned.

If the authentication is successful, the permission section 322 determines whether or not the payment is enabled (Step S1107). If it is determined that the payment is disabled, the permission section 322 transmits the fact that the payment is disabled to the cash register system 200 of the transmission source. Similarly, in this case, nothing needs to be returned.

On the other hand, if it is determined that the payment is enabled, the payment system 300 transmits information indicating that payment is enabled to the cash register system 200 of the transmission source (Step S1108).

Further, when it is determined that the payment is enabled, each payment system 300 holds information (store system ID) for identifying the cash register system 200 of the transmission source, the account ID 313 whose payment is determined to be enabled, and the payment amount in association with each other. The store system ID is acquired from, for example, a header of data transmitted from the cash register system 200, or the like.

In the cash register system 200 that has received the permission for payment, the presentation section 213 presents the designation reception screen 510 on the second display 271 with the payment system 300 permitted for payment together with the payment amount as the payment destination list 512 (Step S1109).

The register presents the second display 271 to the customer 101, and prompts the customer 101 to select the payment destination. The customer 101 selects a payment destination from the payment destination list. In FIG. 8, it is assumed that a payment destination having the payment system A 301 is selected.

When the reception section 211 receives the selection of the payment destination from the customer 101 (Step S1110), the transmission section 212 transmits the payment request to the corresponding payment system A 301 (Step S1111).

In the payment system A 301 that has received the payment request, the payment section 323 performs the payment (Step S1112), and transmits a fact that the payment has been completed to the cash register system 200 of the transmission source (Step S1113). The payment is performed with the use of the account ID 313 associated with the store system ID of the cash register system 200 of the transmission source.

In the cash register system 200, the cash register processing section 210 displays on the second display 271 that the payment has been completed (Step S1114), and terminates the product purchase sequence.

In Step S1107, if one payment system 300 that permits the payment is provided, the presentation section 213 may be configured to display only the information for identifying the payment system 300, and to transmit the payment request to the payment system 300 without receiving the selection. Alternatively, the presentation section 213 may be configured to receive an instruction of whether or not to perform the payment in the payment system 300.

In addition, if the payment system 300 that permits the payment is 0 in Step S1107 (Step S1115), the presentation section 213 presents the fact to the customer 101 and terminates the processing.

If a default payment destination is set regardless of pre-selection or post-selection, the presentation section 213 may be configured to first transmit the biometric information, the payment amount, and the payment request to the payment system 300 of the payment destination, and perform processing such as the selection of the payment destination only when the payment is disabled.

[Biometric Information Acquisition Process]

Next, details of the biometric information (face image) acquisition process in the biometric information acquisition device 230 will be described.

In the present embodiment, the biometric information acquisition device 230 repeats trials for a predetermined maximum number of times until a face image that can be authenticated can be acquired. In other words, the biometric information acquisition device 230 repeats imaging while determining whether or not the acquired face image can be authenticated. Whether or not authentication is enabled is determined is, for example, based on whether or not a feature for authentication can be extracted. For example, when the acquired biometric information (face image) is short in the amount of light, shadowed, or partially hidden, because the feature cannot be extracted, the biometric information acquisition device 230 determines that the authentication is disabled.

If it is determined that authentication is disabled, the biometric information acquisition device 230 changes an imaging condition and retries. For example, the biometric information acquisition device 230 changes an imaging angle, the amount of light, and the like. If a face image that can be authenticated cannot be acquired even after the trials are repeated for a predetermined maximum number of times, the biometric information acquisition device 230 gives up the acquisition of the face image as an acquisition failure. In this case, the biometric information acquisition device 230 notifies customer 101 of this fact and uses other methods such as a credit card ID for authentication.

Figure 9:
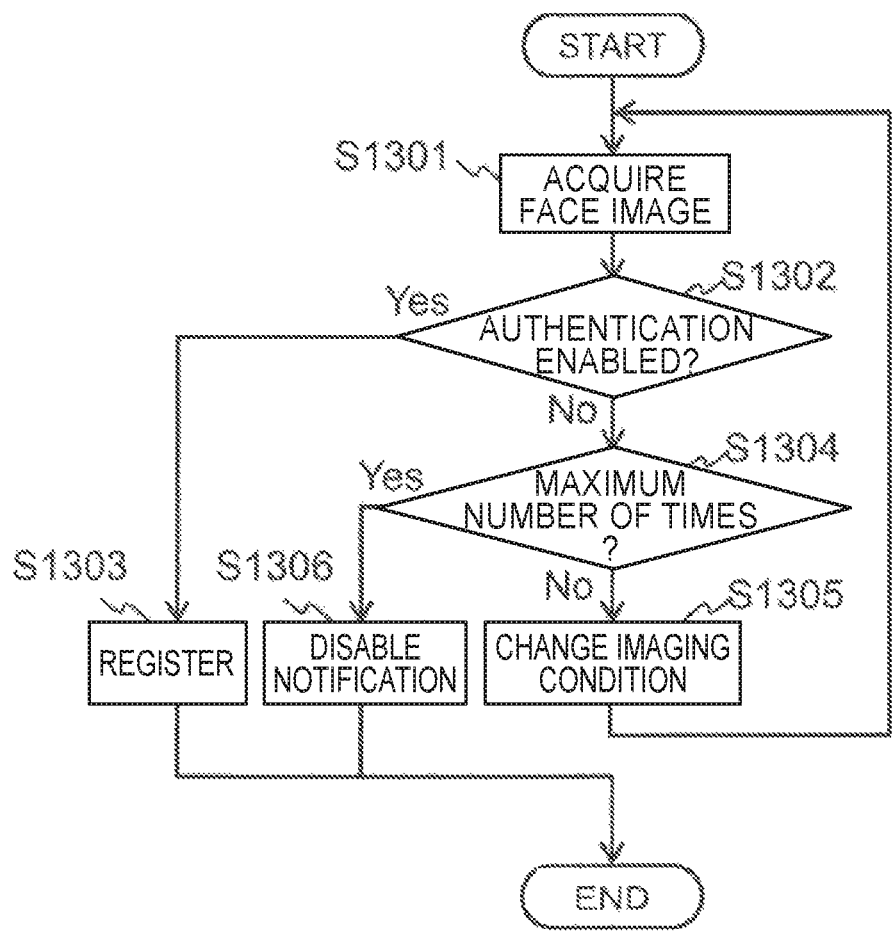
FIG. 9 is a flowchart of a biometric information acquisition process according to the first embodiment.

FIG. 9 is a flowchart showing a biometric information acquisition process in the biometric information acquisition device 230 of the present embodiment.

The biometric information acquisition device 230 acquires the face image (Step S1301). The biometric information acquisition device 230 determines whether or not the acquired face image can be authenticated with the use of the above method (Step S1302).

Next, if it is determined that the authentication is enabled, the biometric information acquisition device 230 registers the acquired face image in a predetermined area (Step S1303), and completes the processing. In this example, the cash register system 200 holds the acquired face image, for example, in the SD-RAM 263 or the like, in order to transmit the face image to the payment system 300 for authentication.

On the other hand, if it is determined that authentication is disabled, the biometric information acquisition device 230 determines whether or not the imaging has been repeated a predetermined number of times (Step S1304). If the repetition is less than the predetermined number of times, the biometric information acquisition device 230 changes the imaging condition (Step S1305), the process proceeds to Step S1301.

If the predetermined number of times is reached in Step S1304, the biometric information acquisition device 230 notifies this fact (Step S1306) and terminates the biometric information acquisition process.

When the biometric information acquisition process has been terminated without acquiring the face image, the cash register system 200 prompts the customer 101 to input information other than the face image as the authentication information, and receives the input information. Then, the transmission section 212 transmits the received authentication information to the payment system 300 instead of the face image.

Incidentally, in this example, the processing of the biometric information acquisition device 230 of the cash register system 200 has been described. However, the same applies a case of acquiring the face image to be registered in the payment system 300.

[Authentication Process]

Figure 10:
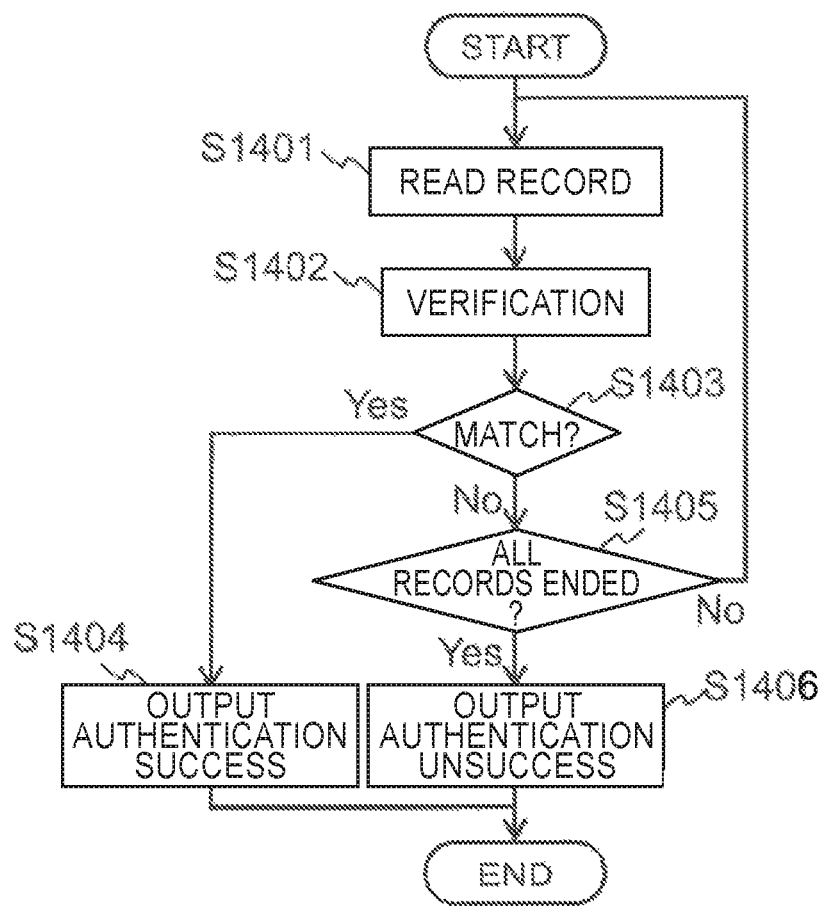
FIG. 10 is a flowchart of an authentication process according to the first embodiment.

Next, a flow of the authentication process by the authentication section 330 in the payment system 300 will be described. FIG. 10 shows a processing flow of the authentication process.

The authentication section 330 accesses the account DB 310 and reads out each record in a predetermined order (step S1401).

The authentication section 330 verifies biometric information 312 (verification face image) of the read record against the received face image (Step S1402). If the biometric information 312 and the face image match with each other (Yes in Step S1403), the authentication section 330 determines that the authentication is successful, and outputs information indicating that the authentication is successful and the account ID 313 of the record (Step S1404), and the processing is terminated.

On the other hand, if the biometric information 312 and the face image do not match with each other in Step S1403, the authentication section 330 determines whether or not all the records have been verified (Step S1405). If the verification is completed, the authentication section 330 outputs information indicating that authentication is unsuccessful (Step S1406), and the processing is completed.

If all the records have not been verified in Step S1405, the process returns to 1401, the authentication section 330 reads the next record, and the processing is continued.

Incidentally, the verification by the authentication section 330 is not limited to the comparison of image data between the transmitted face image and the biometric information 312 registered in the account DB 310. For example, the authentication section 330 may extract the feature information from the transmitted face image according to a predetermined algorithm and compare the feature information with the feature information extracted from the biometric information 312.

In addition, the authentication section 330 may read the records from the account DB 310, for example, in order of the account ID 313 for verification. If the records can be arrayed in order within the account DB 310 by the above feature, the authentication section 330 may perform a binary search. For example, first, the authentication section 330 compares the transmitted face image with the biometric information 312 of the first and last records of the amount DB 310, and then compares the transmitted face image with the biometric information 312 of the record in the vicinity of the middle of all the account DBs 310. If the order of the feature of the transmitted face image is closer to the order of the first record than the record in the vicinity of the middle of all the account DBs 310, the authentication section 330 compares the transmitted face image with the biometric information 312 of the record in the vicinity of the middle between the first record and the record in the vicinity of the middle of all the account DBs 310. With the use of the binary search, matching search can be performed at a higher speed than a case in which the biometric information 312 of the records is compared in order from the first record.

As described above, the biometric authentication payment system 100 according to the present embodiment includes the biometric information acquisition device 230 that acquires the biometric information of the customer, the reception section 211 that receives the designation of the payment system 300 as the payment destination, the transmission section 212 that transmits the biometric information and the payment amount to the payment system 300, the authentication section 330 that performs the authentication process with the use of the transmitted biometric information, and the payment section 323 that pays the payment amount when the authentication result is successful in authentication, and the payment destination is designated.

At present, each customer has a plurality of credit cards, and naturally selectively uses those credit cards depending on the situation according to the type of store, the type of purchased product, and the like. Also, at present that online shopping has become commonplace, the same procedure is always required instead of using cash, such as presenting credit cards issued by card issuers and entering PINs (personal identification numbers) at stores.

In the present embodiment, the biometric information of the customer 101 is used as alternative information corresponding to the credit card ID. The credit card company extracts the credit card ID by verifying against the biometric information of the customer 101 transmitted from the store, and performs the payment using the extracted credit card ID.

In addition, a credit card used for the payment can be selected from a plurality of credit cards possessed by the user at the store.

According to the present embodiment, in the payment, the customer 101 is authenticated with the use of the biometric information of the customer 101 such as the face image. For that reason, the customer 101 can perform the payment for the product without presenting the credit card or a mobile information terminal only by holding the product and arranging in a cash register. In the payment using the biometric authentication, the payment can be performed using only biometric information, which is highly convenient for the customer 101 as a user.

In addition, since the reception section 211 that receives the designation of the payment system 300 as the payment destination is provided, the customer 101 can select a desired card in the payment even when the customer 101 has a plurality of cards. Therefore, higher convenience can be provided.

When the store has its own or recommended default payment destination, if the customer touches the identification information 511 or times out without any touch, the search authentication of the biometric information can be automatically performed by the default payment destination, and the payment can be executed.

In the case of the post-selection, since the credit card company that the customer does not use is not displayed on a menu, the customer can select the payment destination that can be used reliably without making a mistake in the payment destination.

Further, according to the present embodiment, since the matching authentication with the biometric information of the designated credit card registered at the time of contract is performed at each credit company, all the credit cards corresponding to the biometric authentication can be used at all stores that have introduced the above system.

<Modification>

In the present embodiment, an example in which the biometric information acquisition device 230 acquires the face image of the customer 101 from one direction such as a front side is described, but the present invention is not limited to the above example. For example, the face image may be acquired from several directions.

Figure 11A:
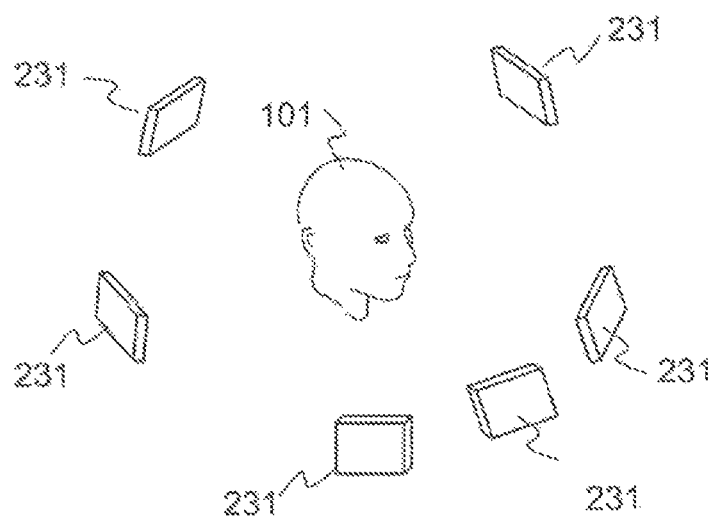
FIG. 11A is an illustrative diagram illustrating a placement mode of a biometric information acquisition device according to a modification of the first embodiment.

An example of the biometric information acquisition device 230 in this case is shown in FIG. 11A. An example in which six cameras 231 as the biometric information acquisition device 230 are provided, for example, on the front, left and right, rear, front diagonal right side and front diagonal left side of the customer 101 as the subject is illustrated.

Figure 11B:
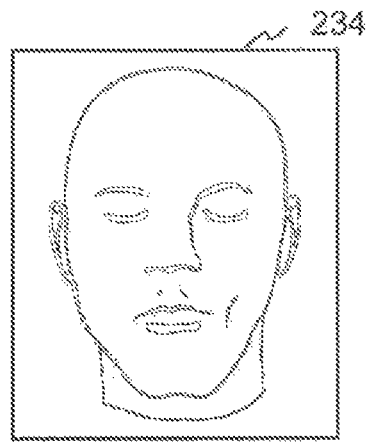
FIGS. 11B and 11C are illustrative diagrams illustrating an acquired face image example.
Figure 11C:
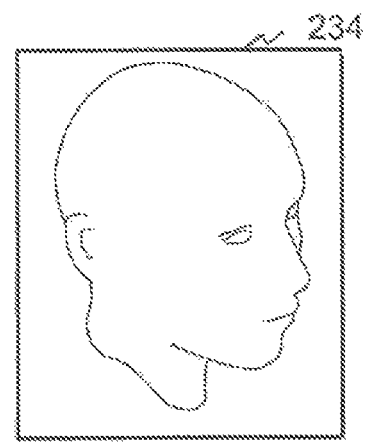

As shown in FIG. 11B and FIG. 11C, cameras 231 acquire face images 234 from different directions, and transmit all the face images 234 to the payment system 300.

The payment system 300 verifies the all of the transmitted face image 234 against the biometric information 312 (verification face image). This increases the authentication accuracy.

In this case, even in the payment system 300, the face images of the customer 101 acquired from the multiple directions may be registered as the verification face image.

For example, the customer 101 does not necessarily face the biometric information acquisition device 230 in front of the cash register processing section 210 of the store. According to the present configuration, the probability of authentication increases even in such a case.

Second Embodiment

Next, a second embodiment of the present invention will be described. In the first embodiment, only one piece of biometric information is acquired and authentication is performed. On the other hand, in the present embodiment, multiple authentication means are used according to the amount of money. Hereinafter, the present embodiment will be described focusing on the configuration different from that of the first embodiment.

The configuration of a biometric authentication payment system 100 according to the present embodiment is basically the same as that of the first embodiment. However, in the present embodiment, since the multiple authentication means are used according to the amount of money, the configuration related to the processing is different from that of the first embodiment.

Figure 12:
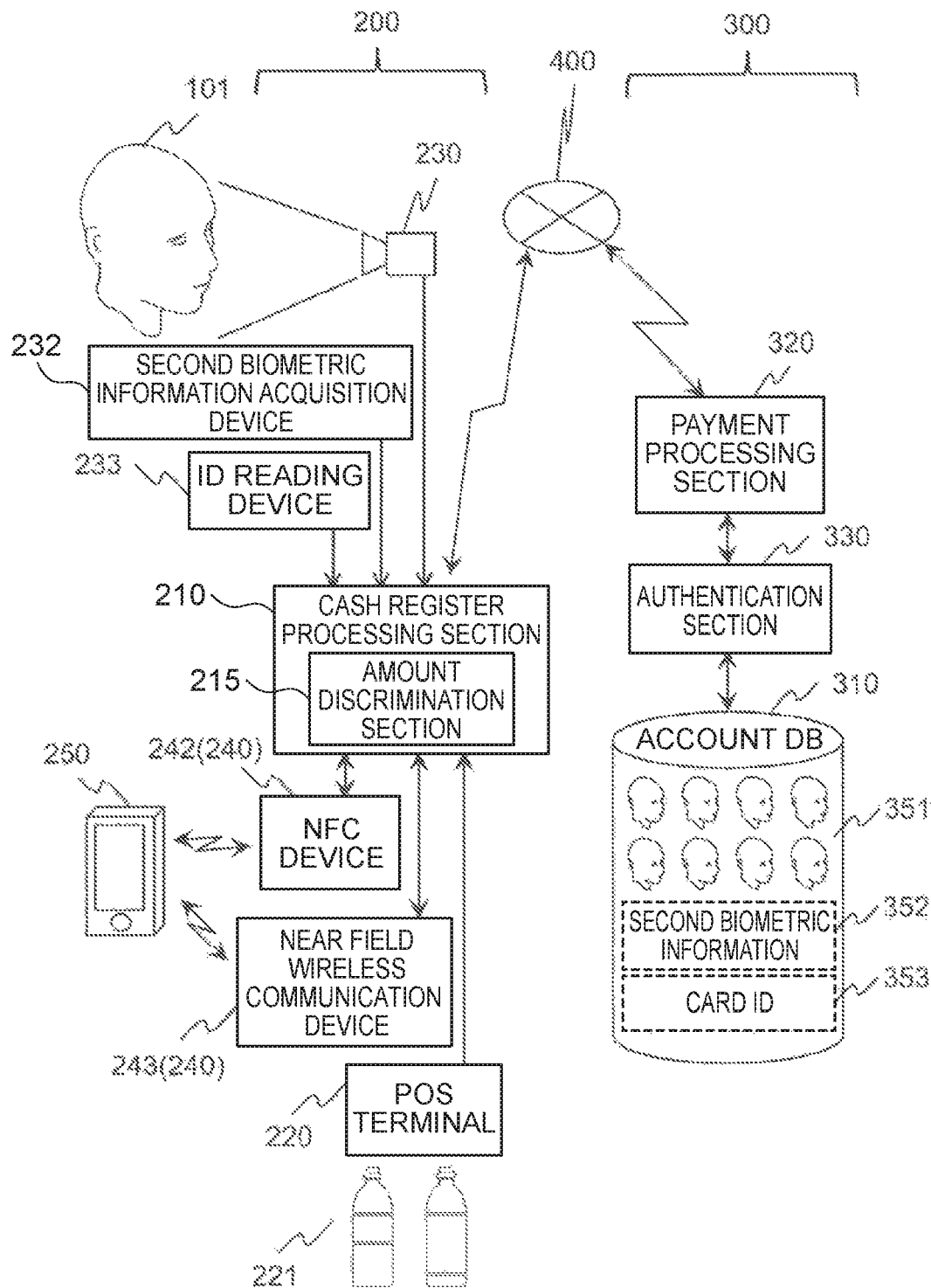
FIG. 12 is an illustrative diagram illustrating a system configuration of a biometric information authentication payment system according to a second embodiment.

Specifically, as shown in FIG. 12, a cash register system 200 includes multiple authentication information acquisition means. Also, a cash register processing section 210 includes an amount discrimination section 215 in addition to the configuration of the first embodiment.

In this example, an example will be described in which as the multiple authentication information acquisition means, for example, as shown in FIG. 12, the cash register system 200 is further provided with a second biometric information acquisition device 232 that acquires second biometric information other than a face image, and an ID reading device 233 that reads a card number (card ID) of a credit card.

Incidentally, the authentication information acquisition means is not limited to those configurations. The card ID may be acquired with the use of an NFC device 242. In that case, the ID reading device 233 may not be provided.

Moreover, in an account DB 310 of a payment system 300, as biometric information 312, all biometric information that can be transmitted from the cash register system 200 are registered. In other words, a verification face image 351, a second biometric information 352, and a card ID 353 are registered. The card ID 353 may be a part or all the account ID 313.

In the present embodiment, as a purchase amount (payment amount) increases, the multiple authentication means are used. More specifically, if the payment amount is less than the amount of money A yen of a first threshold, the authentication of only the face image is performed. If the payment amount is equal to or more than A yen and less than the amount of money B (B>A) of a second threshold, the face image and second biometric information are used for authentication. If the payment amount is equal to or more than B yen, the card ID is further used for authentication. Incidentally, A and B are integers of 0 or more.

Figure 13:
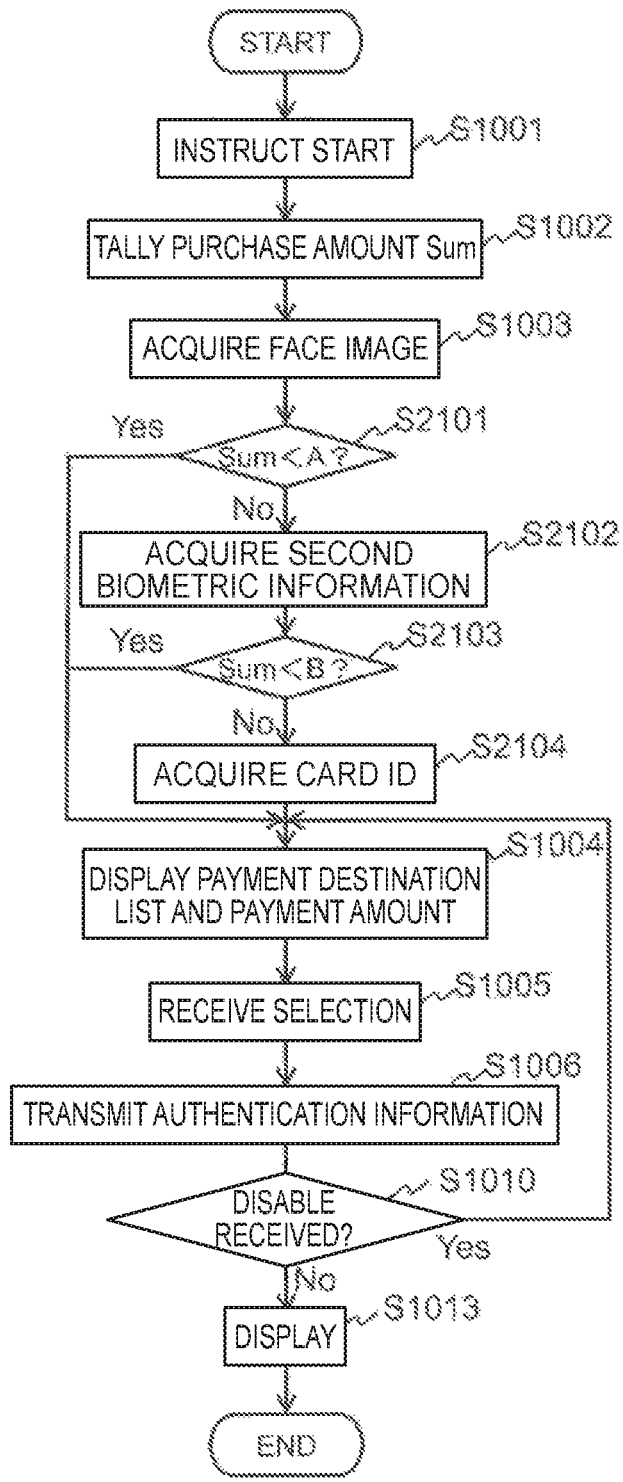
FIG. 13 is a flowchart of a payment process before selection in a cash register system according to the second embodiment.

In that case, a flow of the processing of the cash register system 200 will be described with reference to FIG. 13. This is basically the same as the processing flow of the cash register system 200 in the pre-selected payment process described with reference to FIG. 7. The same reference numerals are assigned to the same processes.

When the order of a customer 101 is reached, a cashier instructs the cash register processing section 210 to start inputting a purchased product of the customer. When receiving a start instruction (Step S1001), the cash register processing section 210 acquires the amount of money of a product code transmitted from a POS terminal 220 and adds the amount of money until an end instruction is received. When receiving the end instruction from the cashier, the cash register processing section 210 tallies the purchase amount (Step S1002). The tallied payment amount is set as Sum.

After the start instruction, the cash register processing section 210 instructs the biometric information acquisition device 230 to acquire the face image of the customer 101. In response to the instruction, the biometric information acquisition device 230 acquires the face image of the customer 101 (Step S1003) and transmits the acquired face image to the cash register processing section 210.

The amount discrimination section 215 discriminates whether or not the payment amount is less than A yen (Step S2101). If the payment amount is less than A yen, the process proceeds to Step S1004 as it is. Also, the reception section 211 displays a designation reception screen 510 including a payment destination list 512 and a payment amount 513, and receives the selection from the customer 101. Since the subsequent processing is the same as that of the first embodiment, a description of the subsequent process will be omitted.

On the other hand, if the payment amount is equal to or greater than A yen (No in S2101), the cash register processing section 210 causes the second biometric information acquisition device 232 to acquire the second biometric information (Step S2102). For example, when the second biometric information acquisition device 232 is a fingerprint scanner, the cash register processing section 210 displays a message prompting to acquire the fingerprint information of the customer 101 on a first display 265. In response to the display, the cashier shows the fingerprint scanner to the customer 101 and proceeds with the acquisition of the fingerprint information.

Thereafter, the amount discrimination section 215 discriminates whether or not the payment amount is less than B yen (Step S2103). If the payment amount is less than B yen, the process proceeds to Step S1004. However, the face image and the second biometric information (fingerprint) are transmitted to the payment system 300 as the authentication information together with the payment amount and the payment request.

In the case of B yen or more, the cash register processing section 210 further acquires the card ID (Step S2104). For that reason, the cash register processing section 210 prompts the acquisition of the card ID, for example, by blinking a lamp of the ID reading device 233. In response to the blinking, the cashier asks the customer 101 to read the card ID. Then, upon acquiring the card ID, the process proceeds to Step S1004. However, the cash register processing section 210 transmits the face image, the second biometric information, and the card ID as the authentication information to the selected payment system 300 together with the payment amount and the payment request.

Incidentally, the payment system 300 performs authentication with the use of the transmitted authentication information. In other words, when the multiple authentication information has been transmitted, the authentication is successful only when all the transmitted authentication information is successfully authenticated.

Figure 14:
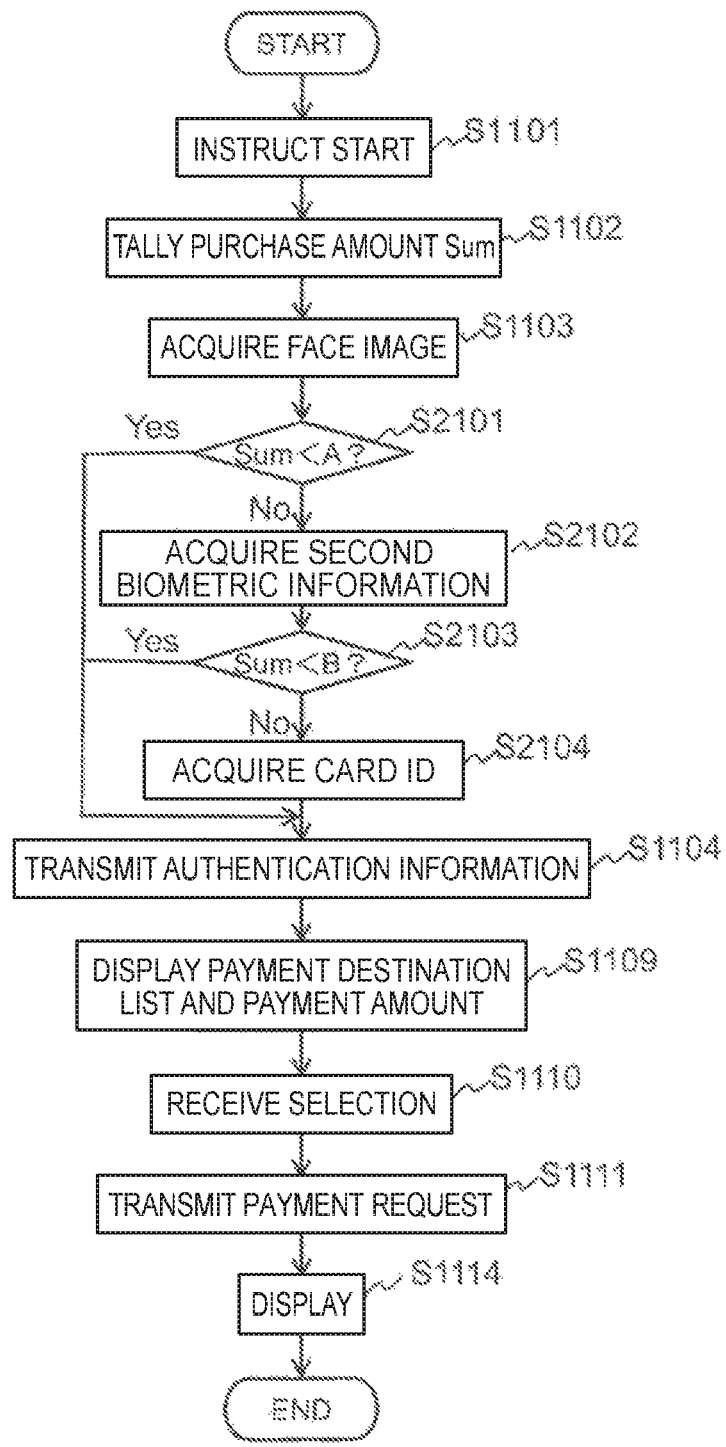
FIG. 14 is a flowchart of a payment process after the selection in the cash register system according to the second embodiment.

A flow of processing in the case of post-selection is shown in FIG. 14. This case is also basically the same as the flow of processing described with reference to FIG. 8. However, after the purchase amount has been tallied, when the payment amount is determined, the cash register processing section 210 adds the authentication information to be acquired according to the payment amount.

In other words, when the payment amount is less than A yen, the cash register processing section 210 acquires only the face image as authentication information. Further, when the payment amount is A yen or more and less than B yen, the cash register processing section 210 acquires the face image and the second biometric information as the authentication information. When the payment amount is equal to or more than B yen, the cash register processing section 210 acquires the face image, the second biometric information, and the card ID as authentication information. Then, the cash register processing section 210 transmits all the acquired authentication information to each contract payment system 300 to request payment permission.

Figure 8:
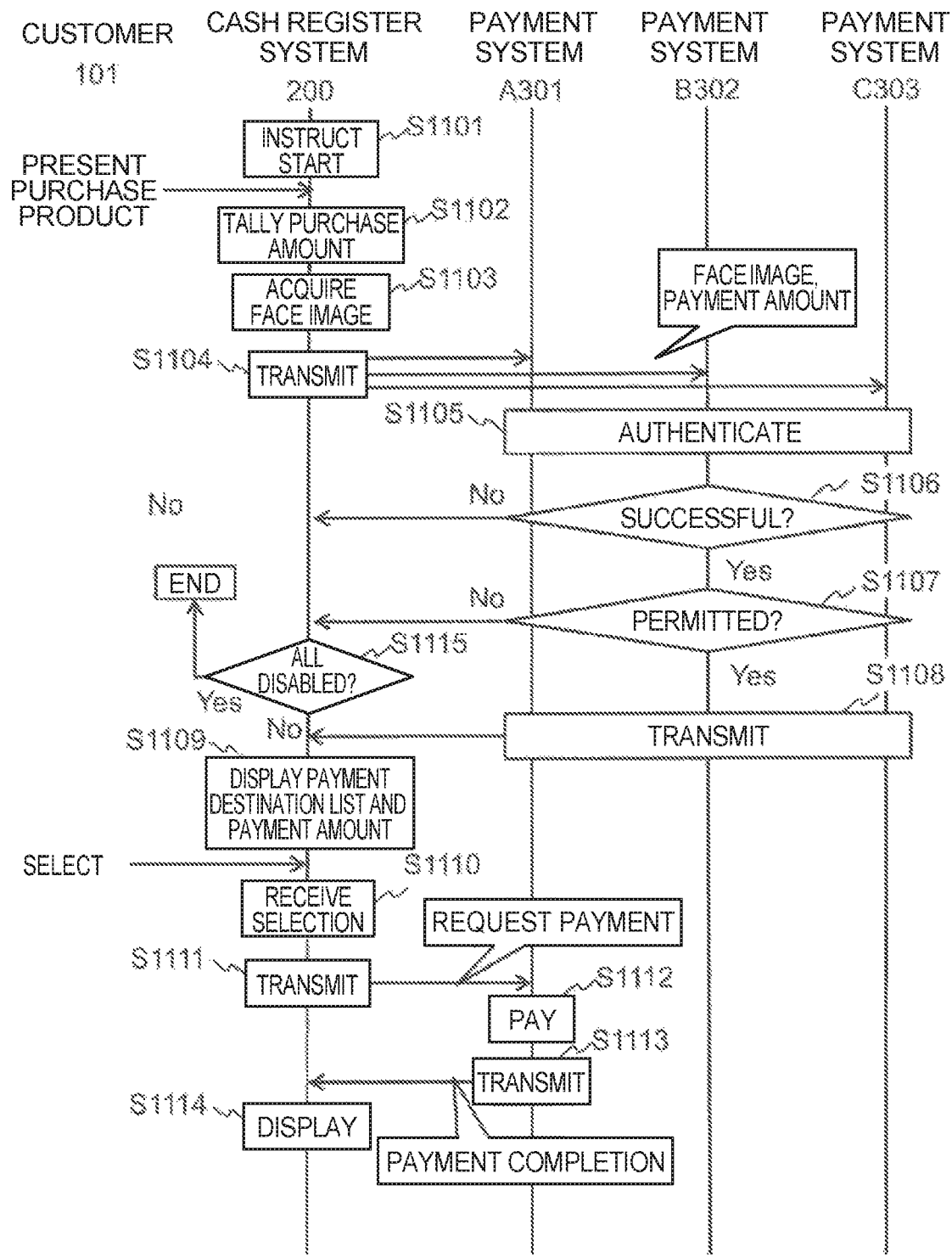
FIG. 8 is a flowchart of a payment process after the selection according to the first embodiment.

Since the processing after receiving the payment permission is the same as that in FIG. 8, a description of the processing will be omitted.

As described above, in the present embodiment, the number of authentication information to be used is changed depending on the payment amount. In other words, every time the payment amount increases, the type of authentication information to be used is increased.

As described above, according to the present embodiment, a system that is highly convenient for the customer can be provided as in the first embodiment. Further, in the present embodiment, the number of authentication information is increased more as the purchase amount increases more. For that reason, as the purchase amount increases more, higher security can be ensured.

Incidentally, in the embodiment described above, as the purchase amount is expensive, the authentication information is added in the order of the face image, the second biometric information, and the card ID. However, the addition order of the authentication information is not limited to the above example. Moreover, the authentication information is not limited to the face image and the fingerprint illustrated as the biometric information. Other biometric information may be used.

Moreover, the present invention is not limited to the method of adding the authentication information according to the payment amount like the processing flow described above. For example, the authentication information to be acquired may be set for each range of the payment amount, it may be discriminated which range the payment amount belongs, and the authentication information of the number set according to the discrimination result may be acquired.

Third Embodiment

Next, a third embodiment of the present invention will be described. In the present embodiment, the number of pieces of authentication information to be acquired is not changed according to the amount of payment, but biometric information (face image) and a card ID are acquired regardless of the payment amount. However, the card ID acquires information on all cardholders in the vicinity of a cash register processing section 210. The card ID is not used for authentication but is used to narrow down the number of destination payment systems 300 such as face images.

In the present embodiment, it is assumed that the card ID has been registered in a mobile terminal 250 having a credit card and ID information, which is carried by the customer 101 in a pocket or a baggage.

A biometric authentication payment system 100 according to the present embodiment basically has the same configuration as that of the first embodiment. However, information to be transmitted to a payment system 300 is different from that in the first embodiment as described above. As a result, the configuration and processing of a cash register system 200 are different from those in the first embodiment. Hereinafter, the present embodiment will be described focusing on the configuration different from that of the first embodiment.

Figure 15:
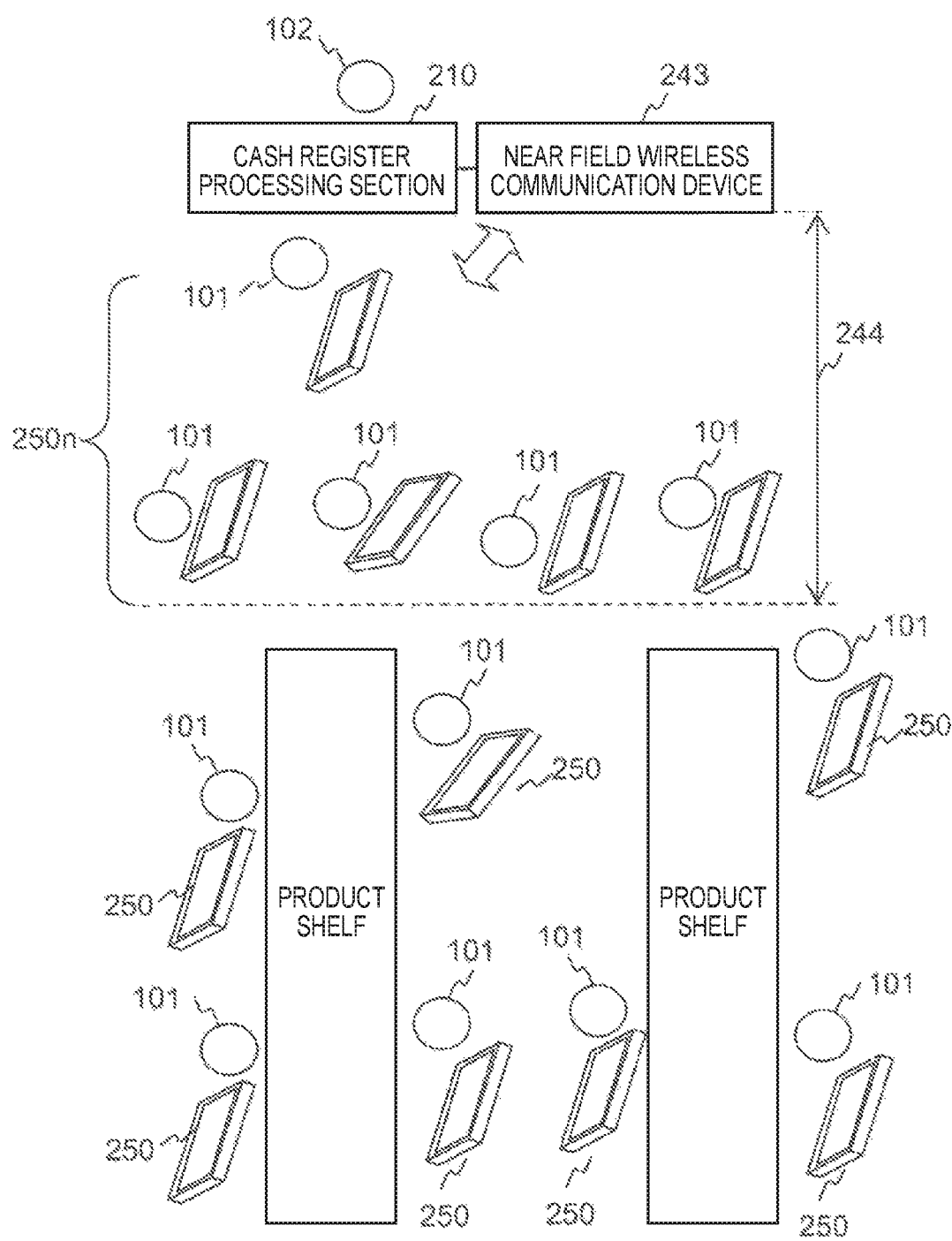
FIG. 15 is an illustrative diagram illustrating an outline of a biometric information authentication payment process according to a third embodiment.

FIG. 15 is a diagram illustrating an outline of processing of the cash register system 200 according to the present embodiment.

A situation using a mobile terminal 250 held by each customer 101 is shown in a layout drawing of a store. In this example, among components of the cash register system 200, a cash register processing section 210 and a near field wireless communication device 243 are illustrated.

The near field wireless communication device 243 acquires credit card information held by the mobile terminal 250 located within a range of a communication distance 244 by a near field wireless communication. The communication distance 244 is determined according to the specification of the near field wireless communication device 243. Alternatively, the communication distance 244 may be set in advance. For example, the communication distance 244 is about several meters. Hereinafter, the mobile terminals 250 within the range of the communication distance 244 are referred to as neighboring terminals 250n.

In a shop, in the present embodiment, the near field wireless communication device 243 acquires necessary information in the card ID of a credit card of a holder holding each neighboring terminal 250n, which is previously registered in the neighboring terminal 250n. The card ID is registered in advance in, for example, a memory or a storage device of the mobile terminal 250.

Figure 16A:
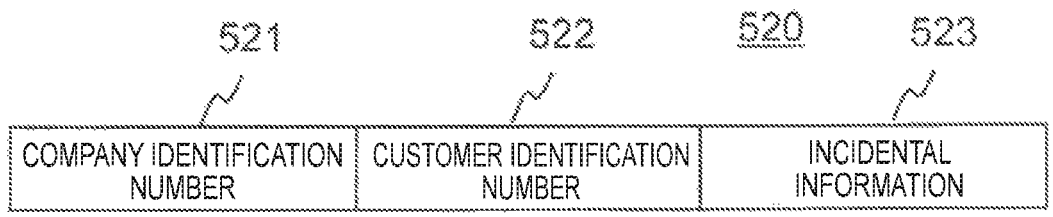
FIG. 16A is an illustrative diagram illustrating a card ID example according to the third embodiment.

As shown in FIG. 16A, a card ID 520 includes a company identification number 521 that is company identification information for identifying a card company, that is, a payment system 300, and a customer identification number 522 that is information unique to the customer 101. In the present embodiment, the card ID 520 acquires only the company identification number 521.

For example, a 16-digit decimal number is registered as the card ID 520. Among those digits, the first six digits are the company identification number 521 indicating a credit card issuing company. In terms of the standard definition, the first six digits are called a bank identification number (abbreviation: BIN) or an issuer identification number (abbreviation: IIN). The card issuing company (issuer) is found by the first six digits.

A numerical value after the first six digits to a digit immediately before the last digit is a customer identification number 522. More specifically, those numerical values represent an account number corresponding to an account ID 313 unique to each customer. In addition, the last digit is a value corresponding to a checksum of the numerical value of the entire card ID 520 number, and is a value for determining whether or not the entire card ID 520 number is valid.

The near field wireless communication device 243 according to the present embodiment reads the first six digits of the card ID 520 held by each neighboring terminal 250n.

Figure 16B:
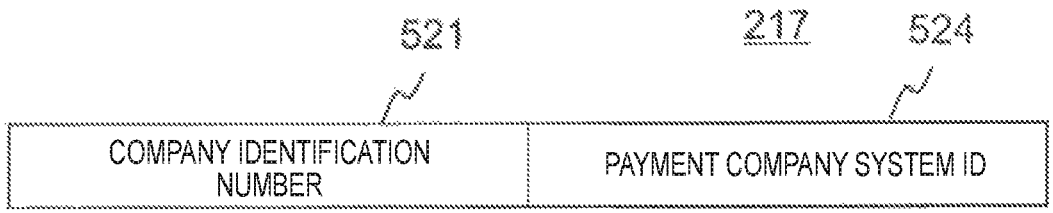
FIG. 16B is an illustrative diagram illustrating an identification number database example according to the third embodiment.

In the present embodiment, the cash register processing section 210 holds an identification number database (DB) 217 that associates the company identification number 521 with each payment system 300 shown in FIG. 16B. The reception section 211 and the transmission section 212 identify the payment system 300 identified by the read company identification number 521 with reference to the identification number DB 217 as needed. Incidentally, for example, as shown in FIG. 16B, in the identification number DB 217, a payment system ID 524 for identifying the payment system 300 is registered in association with the company identification number 521.

For example, in the case of pre-selection, the reception section 211 displays only the payment system 300 identified by the company identification number 521 read by the near field wireless communication device 243 as a payment destination list. Further, in the case of the post-selection, the transmission section 212 transmits the face image to only the payment system 300 identified by the company identification number 521 read by the near field wireless communication device 243.

Figure 17:
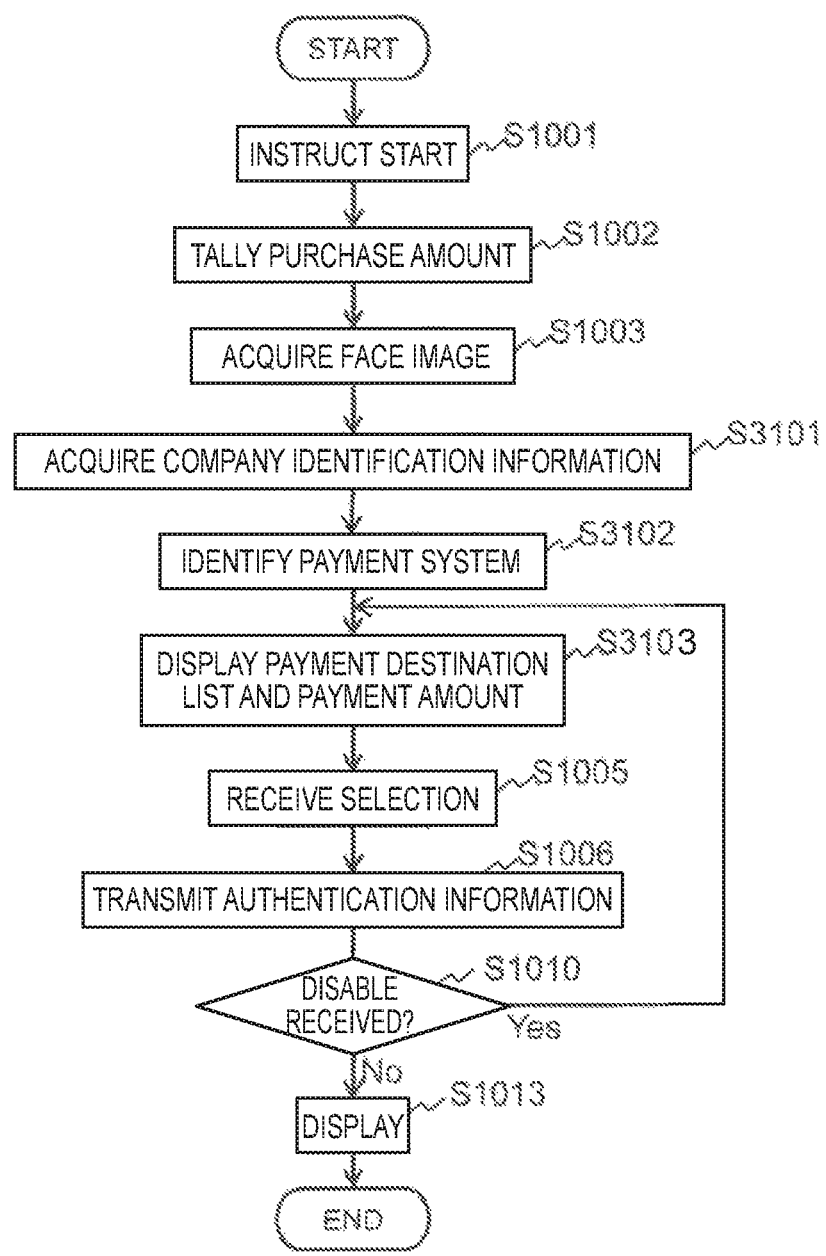
FIG. 17 is a flowchart of a payment process before selection in a cash register system according to the third embodiment.

A flow of processing of the cash register system 200 according to the present embodiment will be described with reference to FIGS. 17 and 18. FIG. 17 is a flow of processing in the case of pre-selection. The processing in the case of pre-selection is basically the same as the processing flow in the cash register system 200 of the processing described in FIG. 7.

When the order of the customer 101 is reached, the cashier instructs the cash register processing section 210 to start an input of the purchase product of the customer. When receiving a start instruction (Step S1001), the cash register processing section 210 acquires the amount of money of the product code transmitted from the POS terminal 220 and adds the amount of money until an end instruction is received. Upon receiving the end instruction from the cashier, the cash register processing section 210 tallies the purchase amount (Step S1002).

After the start instruction, the cash register processing section 210 instructs the biometric information acquisition device 230 to acquire the face image of the customer 101. Upon receiving the instruction, the biometric information acquisition device 230 acquires the face image of the customer 101 (Step S1003), and transmits the face image to the cash register processing section 210.

After the start instruction, the cash register processing section 210 instructs the near field wireless communication device 243 to acquire the company identification numbers 521 of each neighboring terminal 250n. Upon receiving the instruction, the near field wireless communication device 243 performs a near field wireless communication with the neighboring terminal 250n, acquires the company identification number 521 (Step S3101), and transmits the acquired company identification number 521 to the cash register processing section 210.

The reception section 211 refers to the identification number DB 217 and identifies the payment system 300 associated with each acquired company identification number 521 (Step S3102). Then, the reception section 211 creates the payment destination list 512 with the use of the identified payment system 300, displays the designation reception screen 510 including the created payment destination list 512 and the payment amount, and receives the selection from the customer (Step S3103). Then, the reception section 211 transmits the biometric information, the payment amount, and the payment request to the selected payment system 300. The subsequent processing is the same as that in the first embodiment, and therefore a description of the processing will be omitted.

Figure 18:
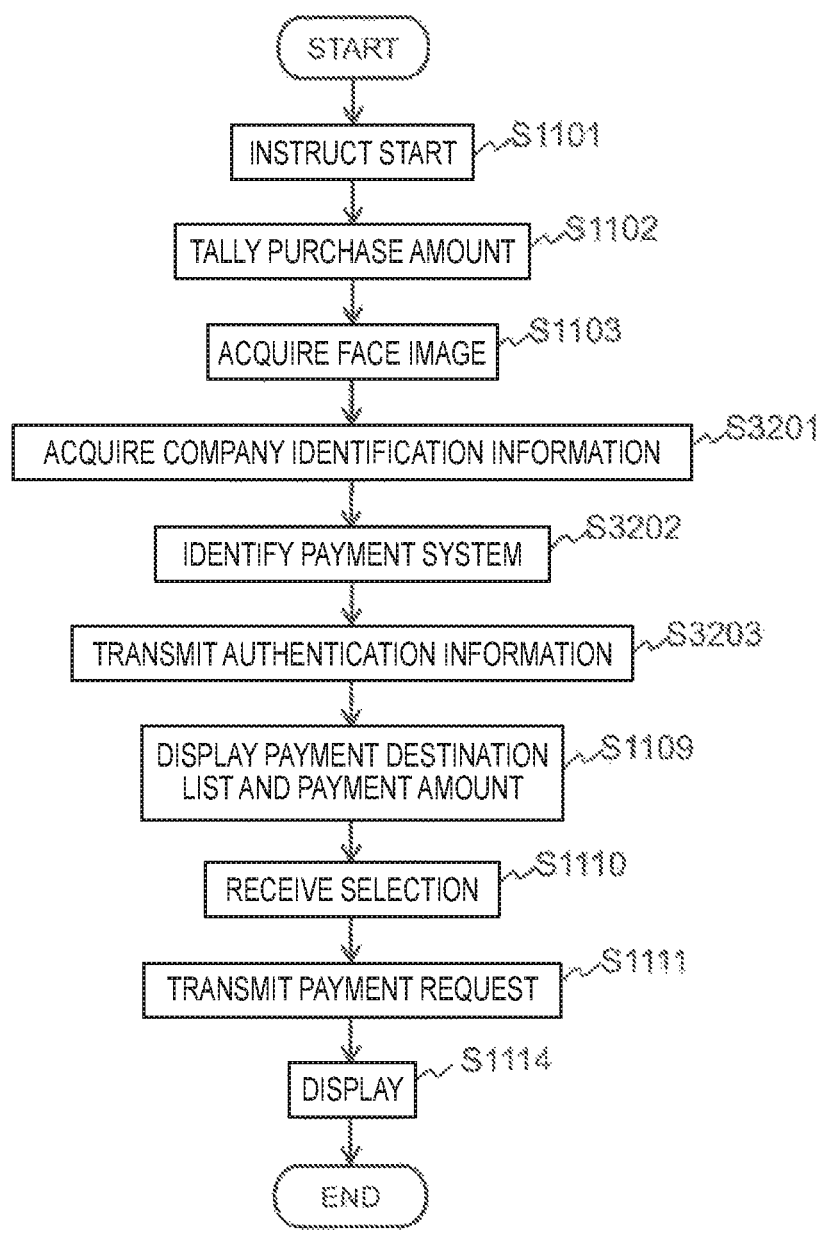
FIG. 18 is a flowchart of a payment process after the selection in the cash register system according to the third embodiment.

A flow of processing in the case of post-selection is shown in FIG. 18. This flow is basically the same as the flow of processing described in FIG. 8.

When the order of the customer 101 is reached, the cashier instructs the cash register processing section 210 to start an input of the purchase product by the customer. Upon receipt of the start instruction (Step S1101), the cash register processing section 210 acquires the amount of money of the product code transmitted from the POS terminal 220 and adds the amount of money until an end instruction is received. Upon receiving an end instruction from the cashier, the cash register processing section 210 tallies the purchase amount (Step S1102) and obtains the payment amount.

In addition, when receiving a start instruction, the cash register processing section 210 instructs the biometric information acquisition device 230 to acquire the face image of the customer 101. In response to the instruction, the biometric information acquisition device 230 acquires the face image of the customer 101 (Step S1103) and transmits the acquired face image to the cash register processing section 210.

Further, after the start instruction, the cash register processing section 210 instructs the near field wireless communication device 243 to acquire the company identification number 521 of each neighboring terminal 250n. Upon receiving the instruction, the near field wireless communication device 243 performs a near field wireless communication with the neighboring terminal 250n, acquires the company identification number 521 (Step S3201), and transmits the acquired company identification number 521 to the cash register processing section 210.

When the tallying has been finished and the face image and the company identification number 521 of the neighboring terminal 250n have been acquired, the transmission section 212 refers to the identification number DB 217 and identifies the payment system 300 associated with each of the acquired company identification numbers 521 (Step S3202). Then, the transmission section 212 transmits the payment amount and the face image to all the identified payment systems 300 (Step S3203). Since the subsequent processing is the same as that of the first embodiment, a description of the subsequent processing will be omitted.

It should be noted that, as described above, regarding the card ID 520, the identification of the information on the credit card of the customer 101 is performed in detail in order from the high-order digit. Therefore, in the present embodiment, in order to make the specification for reading only the company identification number 521, a contacted communication specification of the near field wireless communication device 243 is set so that only the higher six digits of the card ID 520 can be read. Further, encryption with an encryption key may be performed at the time of reading. This ensures security and prevents illegal reading of card information by a wireless communication.

As described above, in the present embodiment, the near field wireless communication device 243 automatically reads the card ID information of the customer 101 in the vicinity of the cash register processing section 210. The near field wireless communication device 243 uses the card ID information to narrow down the transmission destination of the biometric information and the like.

Since the near field wireless communication device 243 hardly discriminates a distance to the neighboring terminal 250n, the near field wireless communication device 243 reads the company identification numbers 521 of all the neighboring terminals 250n including the mobile terminal 250 of the customer 101. Therefore, for example, when the holders of five neighboring terminals 250n have, for example, credit cards of three payment companies, the company identification numbers 521 of up to 15 companies are read by 3 companies×5 terminals. In this way, the number of payment systems 300 that search for the face images can be identified as 15 among many payment systems 300. For that reason, the transmission destination of biometric information is narrowed down, thereby making it possible to improve the efficiency of face image search. In practice, there may be overlapping payment companies, so further limitation can be made.

As described above, according to the present embodiment, a payment system that is highly convenient for the user can be provided, as in the first embodiment. Furthermore, since the transmission destination of biometric information is limited, the processing speed is increased and the reliability is increased.

<Modification>

In the above embodiment, only the company identification number 521 of the card ID 520 is read out by the near field wireless communication device 243, but the present invention is not limited to this configuration. For example, the near field wireless communication device 243 may be configured to read out more digits. For example, the near field wireless communication device 243 may be configured to read out a part or all the customer identification number 522. In this case, the customer identification number 522 is used not for narrowing down the number of destination payment systems 300 but for narrowing down a search range in the payment system 300.

The read customer identification number 522 is transmitted to the payment system 300 together with the payment amount and the face image. The customer identification number 522 to be transmitted constitutes a part of the account ID 313 of each record in the account DB 310 of the payment system 300.

In the payment system 300, when the authentication section 330 performs authentication with reference to the account DB 310, the authentication section 330 narrows down the search record by some or all the transmitted customer identification number 522, and performs authentication within the narrowed record. As a result, the processing in the payment system 300 can be speeded up and the reliability is increased.

However, the customer identification number 522 is information configuring a part of the account ID 313 as described above. For that reason, high security is required in the communication of the information. In that case, for example, the cash register processing section 210 may be configured such that the near field wireless communication device 243 cannot read the card ID 520 unless the cash register key 269 is inserted. The cash register processing section 210 may be configured so as to encrypt a wireless communication content. The encryption key may be configured to be held by the cash register key 269 as electronic information. The encryption key is an encryption key set between the cash register system 200 and each payment system 300, and is provided so that a third party cannot purchase the encryption key and obtain an illegal copy.

The near field wireless communication device 243 is designed to read only a partial numerical value of the card ID 520 and sets all the digits of the card ID 520 to be unreadable, thereby being capable of preventing a security accident such as a credit card ID leakage.

Further, the number of digits of the card ID 520 read by the near field wireless communication device 243 may be selected. For example, the following three reading modes are set according to the number of digits to be read, and any mode is selectable from those reading modes.

A) Only company identification number 521

B) Company identification number 521, and a part of the customer identification number 522 (for example, four digits in all nine digits, etc.)

C) All card IDs 520

In this case, three kinds of reading modes are configured to change and read a security level. The reading mode is set in advance in the cash register system 200.

In the case of A), the read information is used when selecting the payment system 300 as described above. On the other hand, in the case of B) or C), the read information is used to limit a search range when searching on the payment system 300 side.

Therefore, although the security level is increased in the order of A), B), and C), there is an advantage that the certainty and search speed of authentication are increased. As a result, the safety of information leakage can be ensured when reading the card ID 520 from the mobile terminal 250 of a customer other than the customers 101 lined up at a cash register. In other words, the security level in reading the card ID 520 is changed by the cash register according to a transaction state with the customer, thereby being capable of realizing various operation sequences that increase convenience while ensuring security.

Incidentally, in the mobile terminal 250, for example, regardless of a request from the outside, such as the cash register system 200, a reading range may be limited. For example, in the above mode C), even when receiving a request for reading out all digits of the card ID 520, only the company identification number 521, or only the company identification number 521 and a part of the customer identification number 522 may be allowed to be read out from the mobile terminal 250. This can be realized by setting the mobile terminal 250 side to return only a predetermined number of digits in response to a request of the credit card ID by the near field wireless communication.

Further, a target may not be the mobile terminal 250. For example, when the credit card can perform a communication by receiving a wireless power supply in a range of some near distance, the same function is provided in the credit card, and reading of a predetermined number of digits of the card ID 520 may be realized.

<Modification>

In the above embodiment, the near field wireless communication device 243 reads the information on all the neighboring terminals 250n within the communication distance 244. However, the communication distance 244 may be set to be small, and only the information of the mobile terminal 250 of the customer 101 who performs payment at the cash register processing section 210 may be read.

With the configuration described above, in the case of pre-selection, the payment destination list to be presented can be further narrowed down. In the case of post-selection, the number of payment systems 300 to be transmitted can be reduced.

Further, when the multiple card IDs 520 are stored in the mobile terminal 250 of the customer 101, incidental information 523 may be stored as shown in FIG. 16A. The incidental information 523 includes, for example, information that identifies a card that is preferentially used when the customer 101 normally uses the card, and information that sets a preferentially used card for each store. For example, the incidental information 523 is user setting information set by the user. When reading the card ID 520, the near field wireless communication device 243 also reads the incidental information 523.

When the priority order has been registered, the selection process in the pre-selection, the post-selection, or the like is not necessary. In other words, the cash register processing section 210 receives the company identification numbers 521 and the priority orders of the multiple card IDs 520 read by the near field wireless communication device 243. Then, the cash register processing section 210 transmits the payment amount and the face image together with the payment request to the payment system 300 corresponding to the company identification number 521 having the highest priority of the incidental information 523 among the multiple company identification numbers 521.

At this time, when receiving information on payment disable from the payment system 300, the cash register processing section 210 then transmits the payment amount and so on to the payment system 300 high in the priority. The cash register processing section 210 repeats the above processing in order from the high company identification number 521 higher in the priority until receiving the notification of payment enabled or payment end.

Incidentally, the multiple priorities registered as the incidental information 523 may be set according to the payment amount. Furthermore, the incidental information may not be the priority itself. For example, the incidental information may be an algorithm for selecting an optimal payment destination with the use of information on a point grant rate set for each card, a usage frequency of each card, a remaining usage limit amount, or the like.

In this case, the cash register processing section 210 calculates a payment system 300 most suitable for the payment at that time from the multiple payment systems 300 corresponding to the multiple read company identification numbers 521 according to the algorithm read by the near field wireless communication device 243 as the incidental information 523.

Further, the incidental information 523 may be a preset payment destination (default payment destination) for each store or store group.

As a result, biometric authentication search can be performed only within the payment system 300 designated by the card ID 520 transmitted from the mobile terminal 250, and more efficient biometric authentication can be executed.

Incidentally, a storage location of the incidental information 523 may not be necessarily in the mobile terminal 250 or the credit card. For example, the cash register processing section 210 of each store may manage and hold the incidental information 523 for each customer 101.

Further, the incidental information 523 may be stored in a database on a cloud. The incidental information 523 is stored on the cloud, thereby being capable of making the payment with reference to the priority information, regardless of the store where the customer 101 shops. The database on the cloud may be managed by, for example, a service system independent of the cash register system 200 and the payment system 300, which is a dedicated service system to manage and provide the priority of each customer.

Fourth Embodiment

Next, a fourth embodiment of the present invention will be described. In the present embodiment, as in the second embodiment, as a purchase amount is higher, the number of authentication information is larger. However, in the present embodiment, a cash register system 200 includes two communication devices different in a communication distance from each other, and acquires authentication information in different reading modes such as automatic reading and reading by active operation of a customer 101 according to the amount of money.

A biometric authentication payment system 100 according to the present embodiment is basically the same as the configuration of the first embodiment. In the present embodiment, an NFC device 242 is a communication device 240 with a communication distance of non-contact but a distance (for example, 0.01 m or less) enough to touch a terminal. A near field wireless communication device 243 is the communication device 240 having a communication distance of about several meters to several tens of meters. However, in the present embodiment, the communication distance of the near field wireless communication device 243, is set to be able to acquire only information on a mobile terminal 250 of a customer 101 who performs a payment, and present remarkably closer to a cash register processing section 210.

Figure 19:
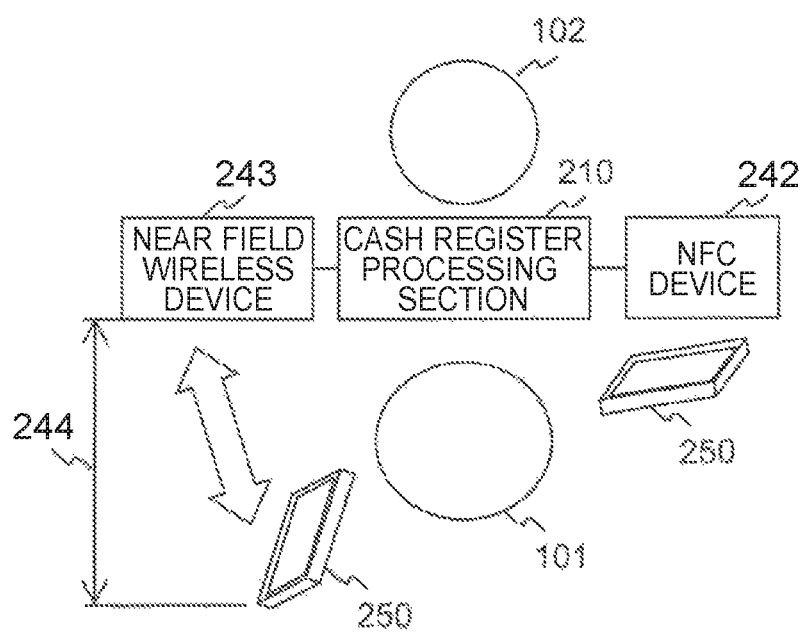
FIG. 19 is an illustrative diagram illustrating an authentication information acquisition process by a cash register processing section according to a fourth embodiment.

FIG. 19 is a diagram illustrating an authentication information acquisition process by the cash register processing section 210 according to the present embodiment. In this figure, reference numeral 101 is a customer and 102 is a cashier.

When the purchase amount is less than C yen, the cash register processing section 210 according to the present embodiment acquires only a face image and transmits the face image to a predetermined payment system 300. If the purchase amount is C yen or more and less than D yen (C<D), the near field wireless communication device 243 receives an acquired company identification number 521 and transmits the received company identification number 521 to the corresponding payment system 300. Further, when the purchase amount is D yen or more, the cash register system 200 prompts the customer 101 to touch the NFC device 242. Then, the cash register processing section 210 acquires a customer identification number 522 through the NFC device 242 and transmits the customer identification number 522 to the payment system 300.

In the present embodiment, with the configuration described above, when the payment amount is a little high, for example, C yen or more and less than D yen, the near field wireless communication device 243 reads the company identification number 521 from the mobile terminal 250 carried by the customer 101. At this time, the customer 101 does not need to take out the mobile terminal 250 from a pocket or a baggage. When the payment amount is higher, for example, D yen or more, the customer 101 takes out the mobile terminal 250 and touches the NFC device 242. As a result, the NFC device 242 reads the customer identification number 522. Incidentally, C and D are each an integer of 0 or more.

In the above example, the near field wireless communication device 243 is configured to read the company identification number 521 and the NFC device 242 is configured to read the customer identification number 522, but the present invention is not limited to the above configuration. Depending on the communication distance, it may be determined whether the first four digits of the card ID 520 are read or all the digits are read. When a distance to the mobile terminal 250 can be measured by the communication device 240, the same communication device 240 may selectively read a partial numerical value or all digits of the card ID 520 according to the distance. In other words, when the distance is equal to or greater than a predetermined distance, the communication device 240 may be configured to read a predetermined number of partial digits (company identification number 521), and when the distance is less than the predetermined distance, the communication device 240 may be configured to read all the digits.

Further, in the communication with the communication device 240 on the mobile terminal 250 or the credit card side, the number of transmittable digits in the card ID 520 may be determined according to the type of communication and the communication distance.

Specifically, the number of reading digits of information of the card ID 520 recorded in the mobile terminal 250 is limited according to the communication method and the communication distance. For example, the numerical values of all digits of the card ID 520 can be read in the contact method and close range wireless communication, and the numerical values of the first six digits corresponding to the company identification number 521 can be read at a medium distance.

With the configuration described above, the security can be ensured and illegal reading of the card number by a wireless communication can be prevented. Further, since a rage in which a biometric authentication is performed can be restricted, the number of the biometric authentication process can be reduced. Therefore, more efficient face authentication can be performed while ensuring the necessary security.

It should be noted that, depending on the situation at the store, taking into account the trade-off between security and the search efficiency, the number of digits read out of the card ID 520 may be configured so as to change dynamically. Further, the cash register processing section 210 may be configured to change the number of digits read out of the card ID 520 according to the payment amount. For example, in the case of purchasing an expensive product, the NFC device 242 prompts the customer 101 to actively contact the mobile terminal 250 so that the NFC device 242 reads all the digits of the card ID. As a result, more reliable personal authentication can be performed. For that reason, a security accident particularly in the case of purchasing an expensive product can be prevented.

Fifth Embodiment

Next, a fifth embodiment of the present invention will be described. In the present embodiment, when biometric information and a payment amount are transmitted from a cash register system 200 to a payment system 300, location information of a store is further transmitted. On the payment system 300 side, a search is made efficient with the use of the location information of the store during an authentication process. In other words, in the present embodiment, a customer 101 determines a search order with the use of a fact that the probability of living in the vicinity of the store is high.

In other words, in the present embodiment, a customer authentication process in the payment system 300 is optimized according to a basic action range of the customer 101. As a result, the face authentication search is performed efficiently.

Figure 20:
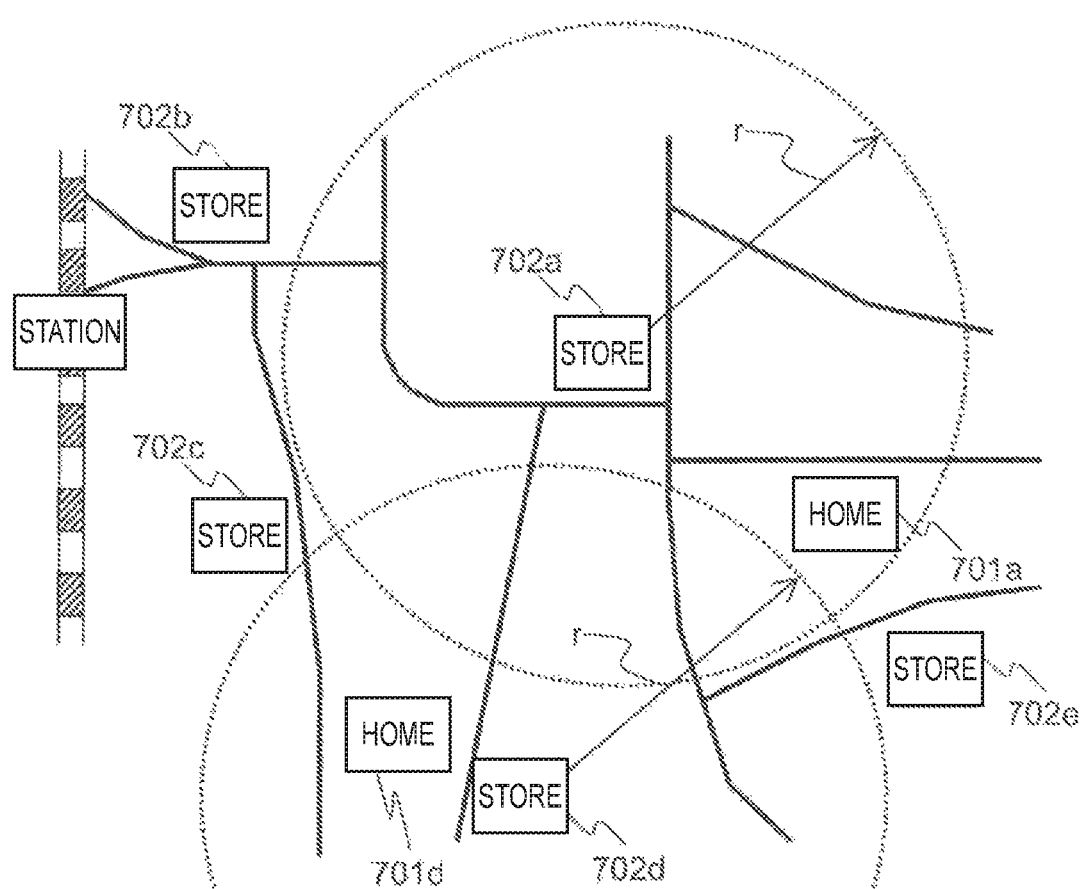
FIG. 20 is an illustrative diagram illustrating an outline of a biometric information authentication payment system according to a fifth embodiment.

Prior to a detailed description of the present embodiment, an outline of the present embodiment will be described. FIG. 20 is a diagram illustrating an outline of processing in the present embodiment. Stores 702a to 702e and customer homes 701a and 701d are shown. When there is no need to distinguish the stores and the customer homes from each other, the stores 702a to 702e and the customer homes 701a and 701d are collectively referred to as a store 702 and a home 701.

In a map shown in FIG. 20, for example, when the store 702 is a convenience store, there is a high probability that the customer 101 resides in the vicinity of the store 702, for example, in the home 701 within a predetermined distance r from the store 702.

In the present embodiment, with the use of the above technique, the store 702 transmits the location information of the store 702 to the payment system 300 together with the face image and the payment amount. In the payment system 300, a verification process is performed in order from the record of the customer 101 closer to the location information of the store 702 with the use of address information of the customer 101 registered in the account DB 310. As a result, early search result determination can be performed and search efficiency can be improved.

The biometric authentication payment system 100 according to the present embodiment basically has the same configuration as that of the first embodiment. However, as described above, the cash register system 200 side transmits the location information of the store 702. Further, the payment system 300 side limits the search range with the use of the location information. For that reason, a configuration for realizing the above process is different from that in the first embodiment. Hereinafter, the present embodiment will be described focusing on the configuration different from that of the first embodiment.

The cash register system 200 according to the present embodiment holds its own location information. The location information is held in, for example, an external memory 267, a flash memory 262, or the like. Incidentally, in the case of a mobile store, a GPS 264 may acquire its own location information.

When transmitting the face image and the payment amount to the payment system 300, a transmission section 212 of the present embodiment also transmits the location information.

The account DB 310 of the payment system 300 includes address data 317 of the customer 101 in the customer information 315 as shown in FIG. 2B.

In the authentication process, the authentication section 330 according to the present embodiment first refers to the location information, and verifies the customers 101 in order from the customer 101 whose address data 317 closer to the location information is registered. For example, when the store 702 is a community-based store such as a convenience store, a possibility that the customer 101 is a neighborhood resident is high.

As shown in FIG. 20, the authentication section 330 may be configured to refer to the location information, pick up the record of the customer 101 whose address data within a predetermined distance r from the store 702 is registered, and preferentially verify the picked-up record.

In an example of FIG. 20, when the store is 702a, a record of the customer 101 living in the home 701a having an address data within a radius r centered on the store 702a is picked up. In that case, the record of the customer 101 who lives in the home 701d outside the radius r is not picked up. On the other hand, in the case of the store 702d, the record of the customer 101 who lives at the home 701d is picked up, and the record of the customer 101 who lives in the home 701a is not picked up.

When the authentication section 330 cannot verify the picked-up records, the authentication section 330 verifies the records of the other customers 101 with a normal procedure.

As described above, in the present embodiment, the cash register system 200 transmits the location information of the store to the payment system 300. The payment system 300 narrows down the search range with the use of the location information.

According to the present embodiment, as in the first embodiment, a payment system that is highly convenient for the customer 101 can be provided. Further, according to the present embodiment, the payment system that is efficient in search, high in response, and high in certainty can be provided.

For example, in the case where the store is a mobile store using an automobile other than a store installed at a fixed position, the location information obtained by a GPS or the like of the cash register processing section 210 of the store is used, thereby being capable of raising the priority of biometric authentication for the customer who has his home within a radius r from the store. As a result, the search efficiency can be raised.

<Modification>

In the present embodiment, the customer 101 may register in advance information identifying a store where the customer 101 is likely to visit in the account DB 310 of the payment system 300.

In other words, as shown in FIG. 2C, store information that is used more frequently is registered as favorite store information 318 in the customer information 315 of the account DB 310, for example.

In this case, the cash register system 200 transmits the store information to the payment system 300 together with the face image and the payment amount at the time of the authentication request.

In the payment system 300, the received store information extracts a group of records registered as the favorite store information 318, and a verification process is preferentially performed from those records. Only when the authentication is not successful in the extracted record, the other records are authenticated.

For example, the store may support registration by preparing an application that allows the customer 101 to register the own store as a favorite store in a desired payment system 300.

Sixth Embodiment

Next, a sixth embodiment of the present invention will be described. In the present embodiment, biometric information (verification face image) 312 registered in an account DB 310 is updated.

Figure 21:
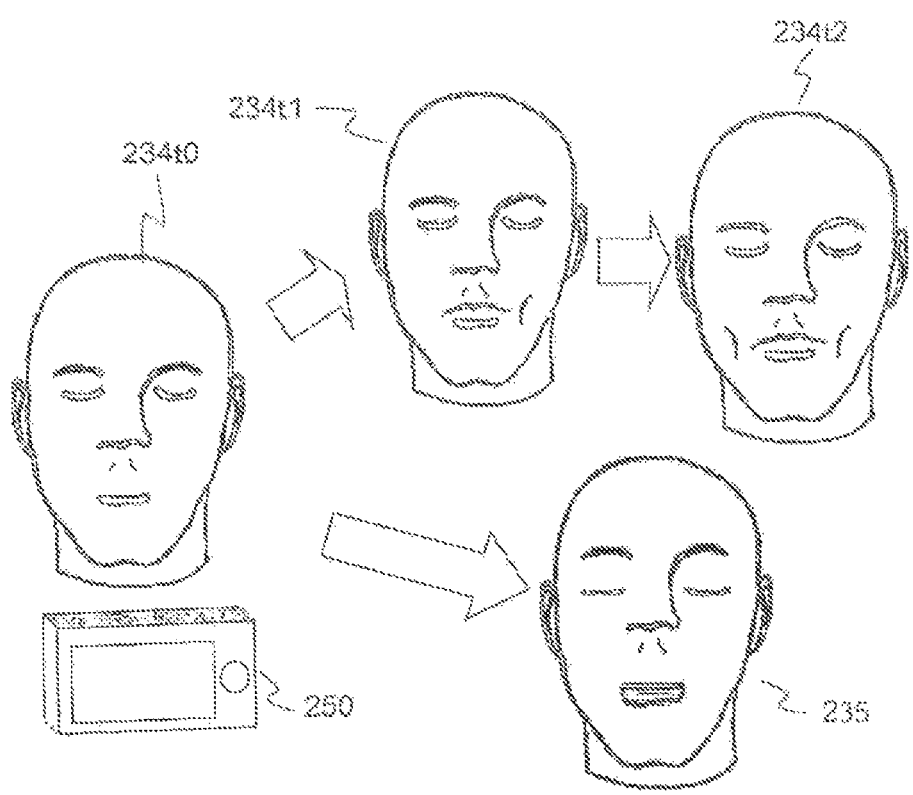
FIG. 21 is an illustrative diagram illustrating a change with time of the biometric information.

As illustrated in FIG. 21, the biometric information may change with time. Particularly, in the case of a face image, such a change with time is remarkable. In the present embodiment, such biometric information is used for authentication. For that reason, it is desirable to update the data of the biometric information 312 for authentication stored in the account DB 310 as appropriate. For example, basically, the latest biometric information is acquired and updated every predetermined update period.

Figure 22:
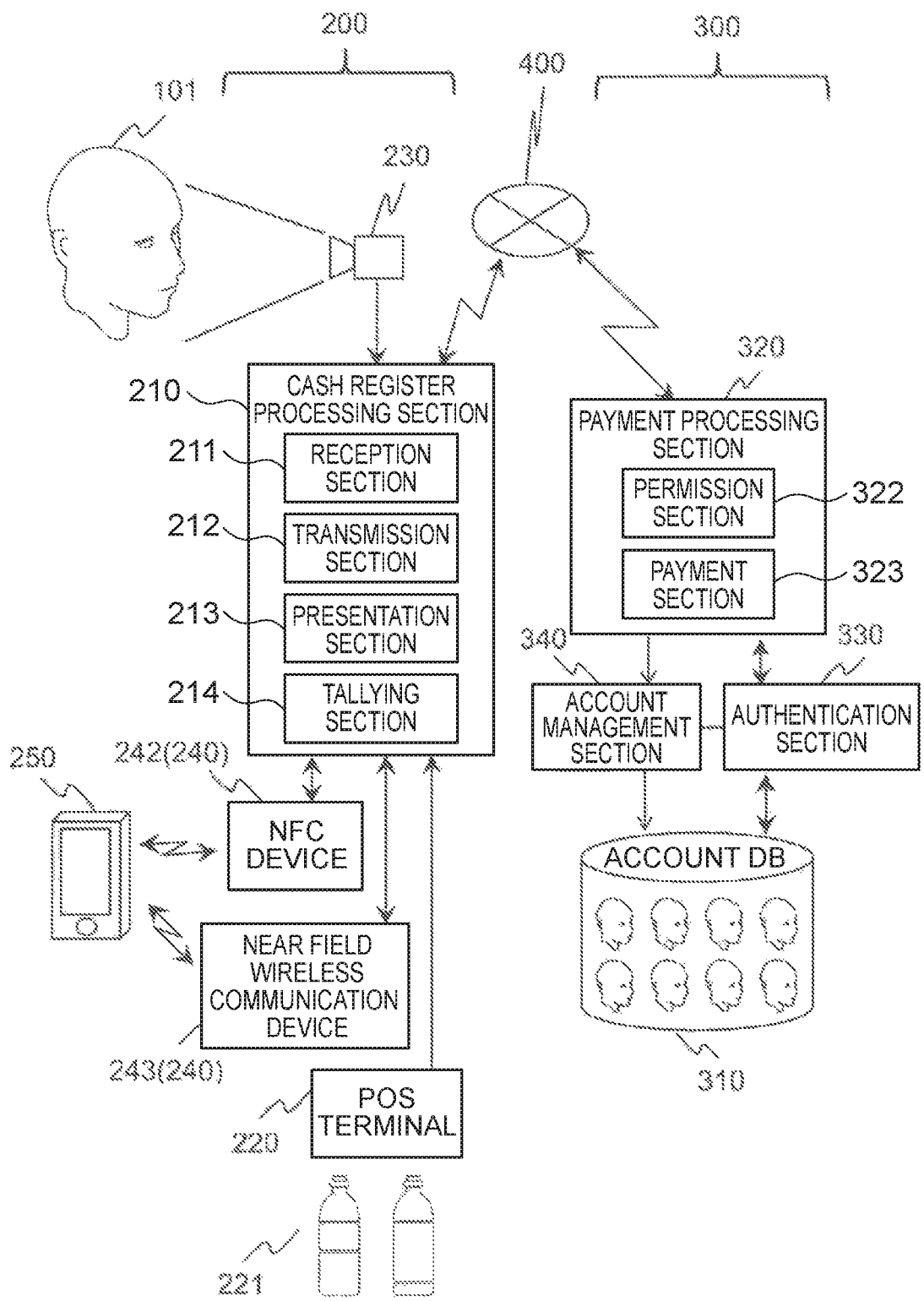
FIG. 22 is an illustrative diagram illustrating a system configuration of a biometric information authentication payment system according to a sixth embodiment.

As shown in FIG. 22, a biometric authentication payment system 100 according to the present modification basically has the same configuration as that of the first embodiment. However, in the present embodiment, the data of the biometric information 312 is updated as described above. For that reason, the payment system 300 according to the present embodiment further includes an account management section 340. Moreover, the biometric information 331 of the account DB 310 according to the present embodiment includes the biometric information itself (verification face image 312a) and an update date and time 312b, as shown in FIG. 2D.

When the face image is transmitted for verification and the authentication is successful, the account management section 340 replaces a registered verification face image 312a in the record with the face image that has been successfully authenticated. The account management section 340 registers the replacement date as the update date and time 312b.

Instead of replacing after successful authentication, the account management section 340 may additionally registers a new face image in association with the update date and time 312b. In this case, in the subsequent authentication, the authentication is performed with the use of the verification face image 312a associated with the latest update date and time 312b.

When the face image has been transmitted for verification, the latest face image is always registered. However, there may be an account in which the face image is not transmitted for a predetermined period. The account management section 340 according to the present embodiment executes a biometric information update process at a predetermined time interval so as to update the verification face image 312a for such an account.

Figure 23:
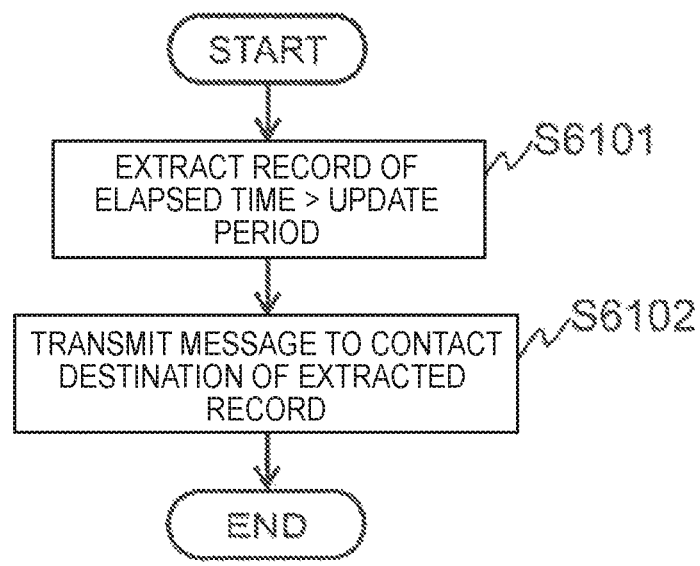
FIG. 23 is a flowchart of a biometric information updating process according to the sixth embodiment.

Hereinafter, a flow of the biometric information update process will be described. FIG. 23 is a processing flow of the biometric information update process by the account management section 340 according to the present embodiment. The biometric information update process is executed at a predetermined time interval.

The account management section 340 scans the account DB 310 and extracts a record whose elapsed time from the biometric information update date and time 312b exceeds a predetermined update period (Step S6101).

The account management section 340 sends a message to each contact of the extracted record so as to transmit the latest biometric information (Step S6102). Specifically, for example, the account management section 340 transmits a message requesting that the latest biometric information be transmitted together with the biometric information acquisition date and time to an email address, or transmits similar contents to a registered address. At this time, the account ID 313 and the like are attached and transmitted.

The above process is repeated at predetermined time intervals.

When the account management section 340 receives biometric information and the like from each customer 101 together with the account ID 313, the account management section 340 first performs authentication by verifying the biometric information currently registered. When the authentication is successful, the account management section 340 replaces the biometric information (verification face image 312*a*) of the account ID 313 with the latest biometric information, and replaces the update date and time 312*b* with the biometric information acquisition date and time.

As described above, according to the system of the present embodiment, the payment system 300 can always hold the latest verification face image. As a result, authentication accuracy can be further improved.

<Modification>

Incidentally, a change of the biometric information over time may be dealt with by performing verification in consideration of the change at the time of authentication instead of updating the biometric information. In this case, the account management section 340 may not be provided.

First, a principle of the present modification will be described. Similarly, in the present modification, an example in which a face image is used as the biometric information will be described.

As shown in FIG. 21, the biometric information including the human face includes an element that changes in a certain direction according to aging and the passage of time, and an element that does not change regardless of aging. For example, in the case of the face image, whitening of hairs and eyebrows is a change due to aging. On the other hand, a positional relationship of parts such as eyes, ears, nose and mouth in the face does not change unless there is a serious problem. In the present embodiment, such differences due to factors are taken into account during authentication.

In this example, it is assumed that a face image 234*t*0 taken at a time t0 using a mobile information terminal such as a camera-equipped mobile phone is registered as biometric information (verification face image) 312 in the account DB 310.

A face image 234*t*1 is a face image at a time t1 when a predetermined time has elapsed from a time t0. In this example, the face image 234*t*1 is an image of a mustache growing and a little thinning. Further, in a face image 234*t*2 at a time t2 over years, the eyebrows are whitened and the skin is getting thinner. Such changes are changes over time and have a certain direction.

In the authentication process in the authentication section 330, such a difference due to aging is ignored. In other words, when the face image 234*t*1 or the face image 234*t*2 is transmitted, the authentication section 330 determines that the person is the same person, not a different person, and determines that the authentication is successful.

On the other hand, compared with the face image 234*t*0, the face image 235 has the same color of the eyebrows and is not thin, but the positional relationship between the eyes and the eyebrows, and the nose and mouth is different. Therefore, when the face image 235 is transmitted, the authentication section 330 makes a determination result that the person is different because elements that do not change due to aging or the passage of time are different.

Also, in the present modification, each time a new face image is transmitted for authentication, the new face image may be additionally stored in the account DB 310 together with the registration date and time, as in the above embodiment. As a result, the account DB 310 becomes a database including direction vectors of change elements with the passage of time, and even after the passage of time, more reliable face image authentication can be performed by taking a direction vector into account.

Seventh Embodiment

Next, a seventh embodiment of the present invention will be described. In the present embodiment, a payment can be performed without registering a product and tallying at a cash register. In other words, after the customer 101 enters the store, and extracts a product from a shelf as a purchase product, the customer 101 automatically performs the face authentication and executes a payment when exiting the store.

Prior to a detailed description of the present embodiment, an outline of the present embodiment will be described. FIG. 24 is an illustrative diagram illustrating an outline of the present embodiment. As shown in the figure, a face image of a customer 101 is acquired by cameras 711 installed at a plurality of locations in a store 710. In addition, a product in a shopping basket 717 is imaged together with the face image. Then, the product put in the shopping basket 717 by the customer 101 whose face image coincide with each other is identified and the amount of the product is tallied.

In a payment area 715 provided in an area immediately before an exit 713 in the payment area 715, the amount of payment is shown to a mobile terminal 250 of the customer 101, the selection of a payment company is accepted, and the payment is performed through a short distance wireless communication device 243.

Hereinafter, a biometric authentication payment system 100 according to the present embodiment will be described. The biometric authentication payment system 100 according to the present embodiment has the same configuration as that of the first embodiment. Furthermore, the biometric authentication payment system 100 according to the present embodiment includes the multiple cameras 711. Further, a cash register processing section 210 has the configuration of the first embodiment. However, a customer specific tallying section 216 is provided instead of the tallying section 214.

The plurality of cameras 711 are placed at a plurality of locations in the store 710, for example, at positions where an entrance 712, each product shelf 714, and so on, and their vicinities can be imaged. Each camera 711 acquires an image at very short predetermined time intervals and transmits the image to the cash register processing section 210.

The customer specific tallying section 216 analyzes the image transmitted from the camera 711 placed at the entrance 712 and extracts the customer 101 who has newly visited the store. The extraction is performed, for example, by processing such as cutting out an area recognized as a face and acquiring a face image of each customer 101. Thereafter, the customer specific tallying section 216 uses the face image acquired at the entrance 712 as an ID (face image ID), analyzes an image arranged in the vicinity of each product shelf 714 in the store 710, identifies a product in the shopping basket 717 held by a person of the face image identified as the same person as the face image ID, and registers the product as a purchase product in association with the face image ID. This processing is performed for each customer 101 identified by the face image ID.

When the customer 101 reaches the payment area 715, the customer specific tallying section 216 totals the amounts of all the products registered in association with the face image ID at that time to obtain a payment amount. Further, the biometric information acquisition device 230 acquires a face image. Incidentally, whether or not the customer 101 has reached the payment area 715 is determined by an image analysis from the camera 711 placed to image the payment area 715.

Subsequent processing is basically the same as that in the first embodiment. However, the display destination of the payment amount and a payment destination list is the mobile terminal 250 of the customer. In other words, the cash register processing section 210 causes the near field wireless communication device 243 to display the payment amount and the payment destination list on the mobile terminal 250 in the payment area 715. The reception section 211 receives the selection of the payment destination through the near field wireless communication device 243.

For example, in the case of pre-selection, the transmission section 212 transmits the face image acquired by the biometric information acquisition device 230 and the payment amount to the selected payment system 300. In addition, in the case of post-selection, the transmission section 212 transmits the payment amount and the face image to all the payment systems 300. In the present embodiment, the biometric information acquisition device 230 may not be provided. Instead, the face image used as the face image ID may be transmitted to the payment system 300.

For example, a gate may be provided at the exit so that only the customer 101 can pass through the gate when the payment is completed.

In the present embodiment, the operation of the customer 101 by the camera 711 is imaged and analyzed. For that reason, biometric authentication is also effective when authentication is performed with the use of information on a face image and a physique using the camera 711. In the above embodiments, an example in which the face image authentication is used as the biometric authentication method has been described, but the present invention is not limited to the above example. Any biometric authentication method may be used.

Hereinafter, a customer shopping flow according to the present embodiment will be described with reference to FIG. 24. In a part (a) of FIG. 24, the customer 101 carries the mobile terminal 250 and enters the store from the store entrance 712. The customer 101 is just passing through the entrance 712, and in this situation, the cameras 711 image the biometric authentication information such as the face image of the customer 101 and an appearance of the customer 101.

Next, in a part (b) in FIG. 24, the customer 101 picks up a product 716 placed on the shelf 714. When the customer 101 determines to purchase the product 716 after confirming actually, the customer 101 puts the product 716 into the shopping basket 717 as shown in a part (c) of FIG. 24. The camera 711 images the operation (including the operation of stopping the purchase and returning the product to the shelf). The customer specific tallying section 216 records information that the customer 101 purchases the product 716 by analyzing the captured image.

As shown to a part (d) in FIG. 24, when the customer 101 finishes shopping, the customer 101 will head for a cash register. In the present embodiment, there is no cashier at the cash register. Also, the purchased product 716 is not individually read by the POS terminal 220 or the like.

The product 716 is planned to be purchased at the stage (c) in FIG. 24. For that reason, when the customer 101 passes in front of the cash register processing section 210 installed in the payment area 715 of the exit and tries to exit the store from the exit 713, the cash register processing section 210 calculates a total amount of the products 716 put in the shopping basket 717, and captures the face image of the customer 101 with the use of the biometric information acquisition device 230. Subsequent processing is the same as that in the first embodiment.

As described above, in the present embodiment, the customer 101 passes in front of the cash register processing section 210 installed in the payment area 715, and completes the payment by mere selection of the payment destination. At this time, if the priority of the payment destinations is registered in the mobile terminal 250, there is no need to select the payment destination. In other words, the customer 101 can enter the store through the entrance 712, put the product 716 into the shopping basket 717 from the product shelf 714, and leave the store through the exit 713 as it is to make a product purchase payment.

Incidentally, the camera 711 acquires an image so that a series of operations of the customer 101 such as picking up the product 716 from the product shelf 714 and putting the product 716 into the shopping basket 717 can be recognized.

Further, the customer specific tallying section 216 performs provisional registration of the product purchase, and calculates the total amount of the provisionally registered products at a timing when the customer 101 passes through the payment area 715 to determine the payment amount.

Incidentally, in the case of post-selection, a face image may be authenticated immediately after imaging with the use of an image captured by the camera 711 installed at the entrance 712. In other words, at the timing when the customer 101 visits the store, the face image is acquired, and the face image is transmitted to all contracted payment systems 300 to obtain authentication in advance. In this case, since the payment amount cannot be transmitted, it is not determined whether or not the payment is enabled based on the amount of money.

With the above configuration, a waiting time for the authentication process in the payment area 715 can be reduced. Therefore, the payment process of the customer 101 can be completed in a shorter time. Therefore, the customer 101 can leave the store from the exit 713 smoothly.

Furthermore, when the face authentication is difficult by imaging with the camera 711 at the entrance 712, when the customer 101 picks up the product 716 while moving in the store, the image captured by the cameras 711 is used to perform the face authentication. Alternatively, authentication may be performed every time a face image is acquired by the plurality of cameras 711. In this case, the authentication accuracy can be increased with the use of a plurality of captured images.

<Modification>

In addition, each of the above embodiments, the customer 101 performs the payment at the time of purchasing the product in the store. However, the usage environment of the biometric authentication payment system 100 is not limited to the above example. For example, the present invention may be applied to the authentication at the time of entrance in an event venue such as a stadium.

At the event venue, in order to prevent the resale of tickets, face photos may be registered on a dedicated site at the time of ticket purchase, and an attendant may take the face picture and verify the registered face picture against the picture registered by the attendant. However, since the verification is performed manually, there are variations in accuracy, and time and labor are required. In the present modification, the above problem is solved.

Hereinafter, in the present embodiment, it is assumed that the customer 101 registers a face image as a verification face image at a ticket sales company at the time of acquiring the ticket. In addition, the cash register system 200 includes an opening/closing control device that controls opening/closing of a gate of the event venue.

Figure 25:
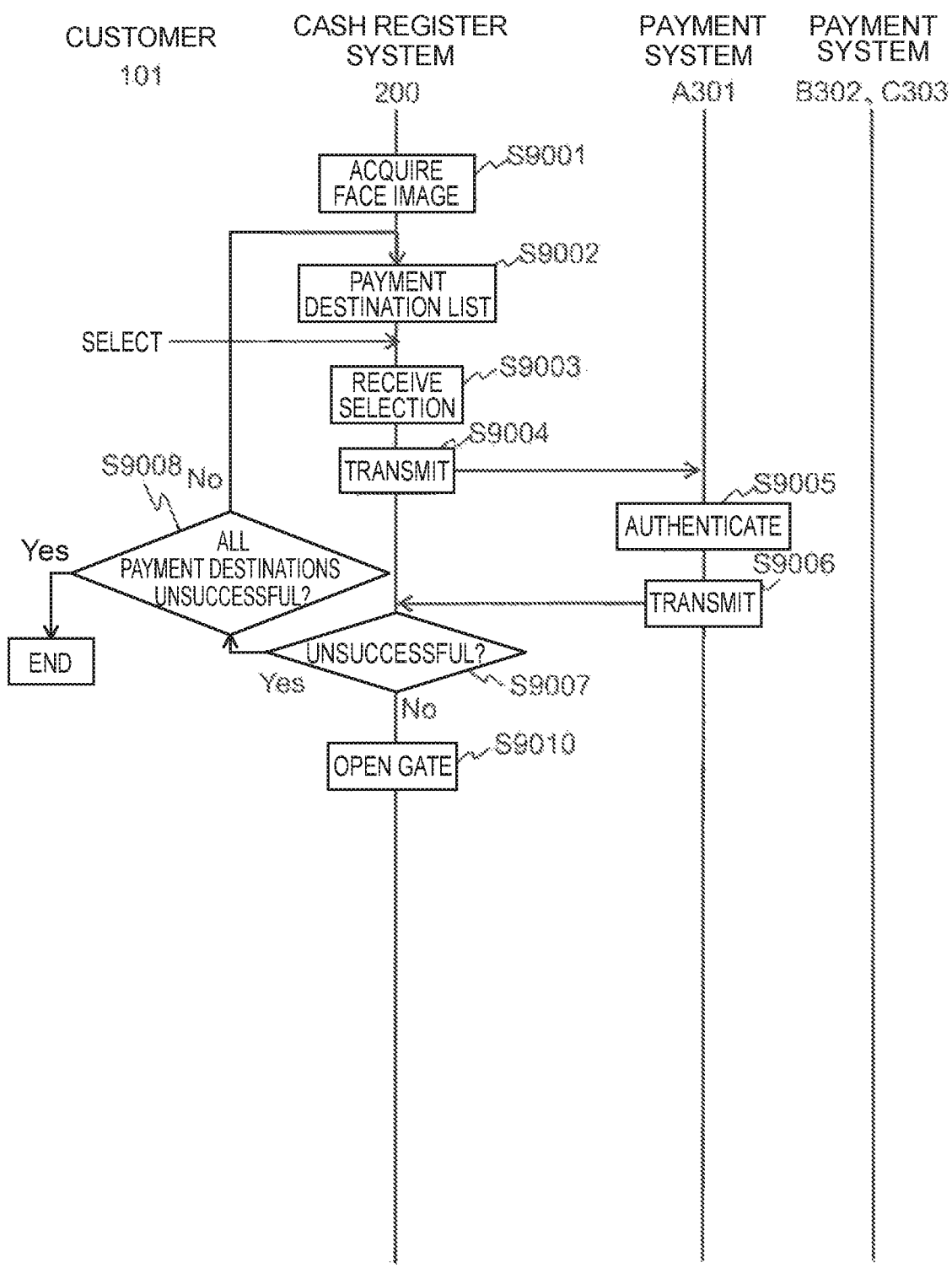
FIG. 25 is a flowchart of a payment process before selection according to one modification of the embodiment of the present invention.

FIG. 25 is a flowchart of an entry authentication process in the case of pre-selection according to the present modification. As described above, the present modification is configured to determine whether or not a gate passage is enabled through biometric authentication at the entrance of an event venue such as a stadium.

When the order of the customer 101 is reached and customer 101 comes in front of the cash register processing section 210, the cash register processing section 210 causes the biometric information acquisition device 230 to acquire the face image of the customer 101 (Step S9001).

The reception section 211 displays the payment destination list 512 that lists the contract payment systems 300 on the second display 271 (Step S9002). In the present modification, the contract payment system 300 is a ticket sales company for this event. In this example, it is assumed that the ticket sales company has payment systems A 301, B 302, and C 303.

A person in charge presents the second display 271 to the customer 101 and prompts the selection of the ticket sales company. The customer 101 selects the ticket sales company from which the customer 101 has purchased the ticket from the payment destination list 512. In this example, it is assumed that the sales company having the payment system A 301 is selected.

When the reception section 211 accepts the selection of the ticket sales company from the customer 101 (Step S9003), the transmission section 212 transmits the face image to the corresponding payment system A 301 (Step S9004).

In the payment system A 301 that has received the transmission of the face image, the authentication section 330 verifies the transmitted face image against the verification face image and performs the authentication (Step S9005). Then, the authentication section 330 transmits the result to the cash register system 200 as the transmission source (Step S9006). In other words, if the authentication is unsuccessful, a response indicating unsuccessful authentication is transmitted, and if authentication is successful, a response indicating successful authentication is transmitted.

When receiving a reply of the authentication unsuccessful, the cash register processing section 210 displays this fact on the second display 271 (Step S9007), returns to the process of Step S9002, displays the payment destination list again, accepts the selection, and repeats the processing. At this time, the payment destination list is created excluding the payment system A 301 for which payment is not permitted.

At this time, in all the contract payment systems 300, if the authentication is unsuccessful, the cash register processing section 210 displays a message indicating the fact on the second display 271 (Step S9008) to notify the customer 101 of the fact, and ends the process.

When receiving a reply of successful authentication from the payment system 301 (Step S9009), the cash register processing section 210 instructs the opening/closing control device to open the gate (Step S9010), and ends the process.

Figure 26:
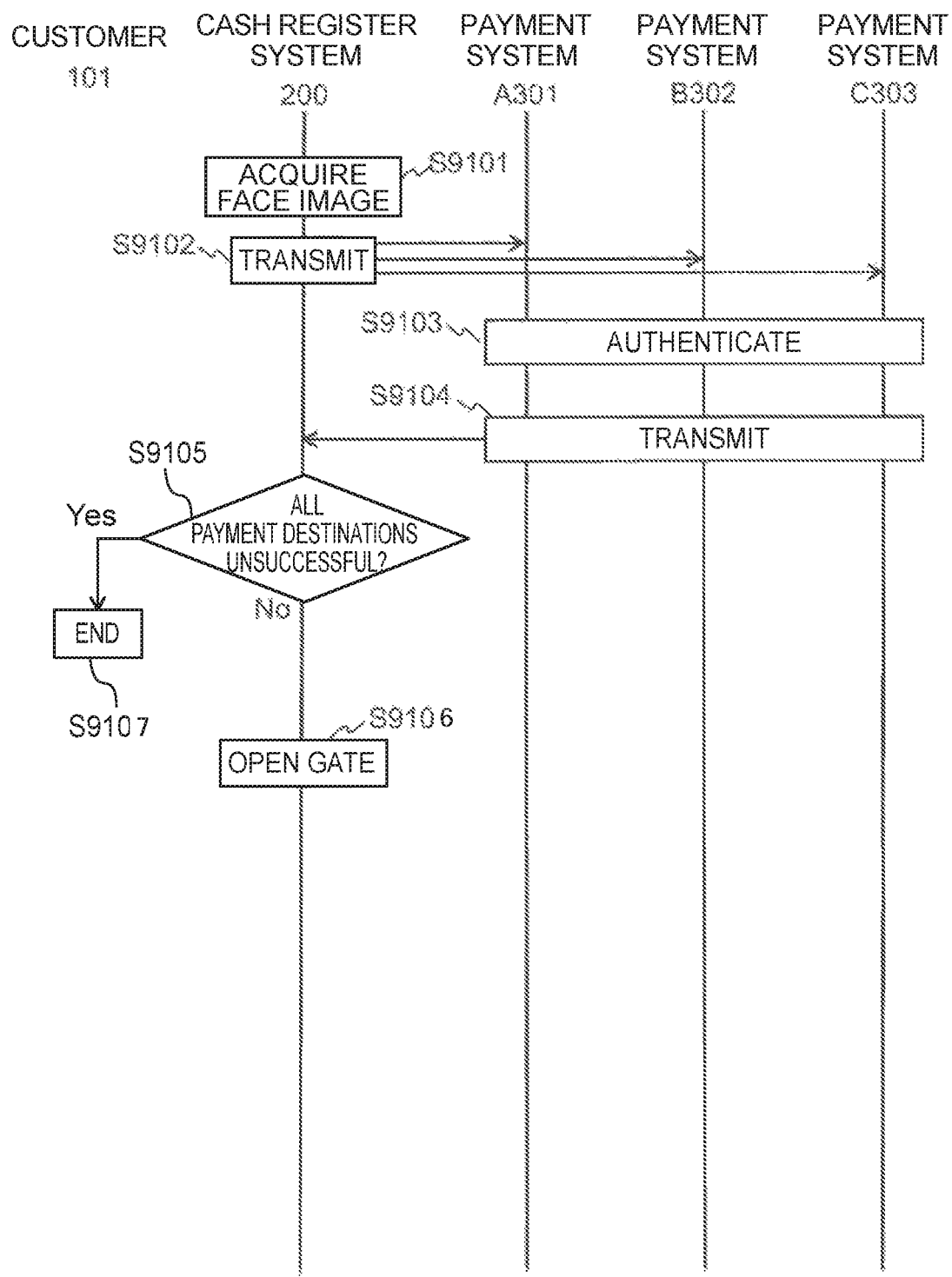
FIG. 26 is a flow chart of a payment process after the selection according to the modification of the embodiment of the present invention.

Next, a flow of payment processing in the case of post-selection will be described with reference to FIG. 26.

When the order of the customer 101 is reached and the customer 101 comes in front of the cash register processing section 210, the cash register processing section 210 causes the biometric information acquisition device 230 to acquire the face image of the customer 101 (Step S9101).

The transmission section 212 transmits the acquired face image to all the contract payment systems 300 (A 301, B 302, C 303) (Step S9102). The contract payment system 300 is a ticket sales company for this event.

In each payment system 300 that has received the face image, the authentication section 330 performs authentication (Step S9103). Each payment system 300 transmits authentication success or failure to the cash register system 200 (Step S9104).

Upon receiving a reply of the authentication success from at least one payment system 300 (Step S9105), the cash register processing section 210 instructs the opening/closing control device to open the gate (Step S9106), and ends the process.

On the other hand, when not receiving the reply of successful authentication from any payment system 300 for a predetermined period, the cash register processing section 210 determines that the authentication is unsuccessful and displays a message indicating the fact on the second display 271 (Step S9107), notifies the customer 101 of the fact, and ends the process.

According to the present modification, a ticket is usually presented, and the specific operation of confirming the ticket can be automatically performed by biometric authentication at the gate through which to pass after confirmation, and the work at the gate is reduced. For that reason, the person can pass through the gate more smoothly. This is particularly effective when a face image that can be captured with a camera is used as biometric information.

The service based on the face authentication is an action that human beings have done naturally. For example, when shopping in the vicinity of his home, the person can get familiar with people at the store and receive discount services, or purchase a product by credit (postpay without documents). This old shopping is digitized and performed simply and accurately so as to be able to image a future in which the above digitalized shopping will be used in all fields.

<Modification>

In each of the above embodiments, the payment system 300 manages the customer's biometric information in association with the customer's account. However, the present invention is not limited to the above mode. For example, a service system 800 independent of each cash register system 200 and each payment system 300 may be provided, and the service system 800 may be configured to perform biometric authentication of the customer 101.

Figure 3B:
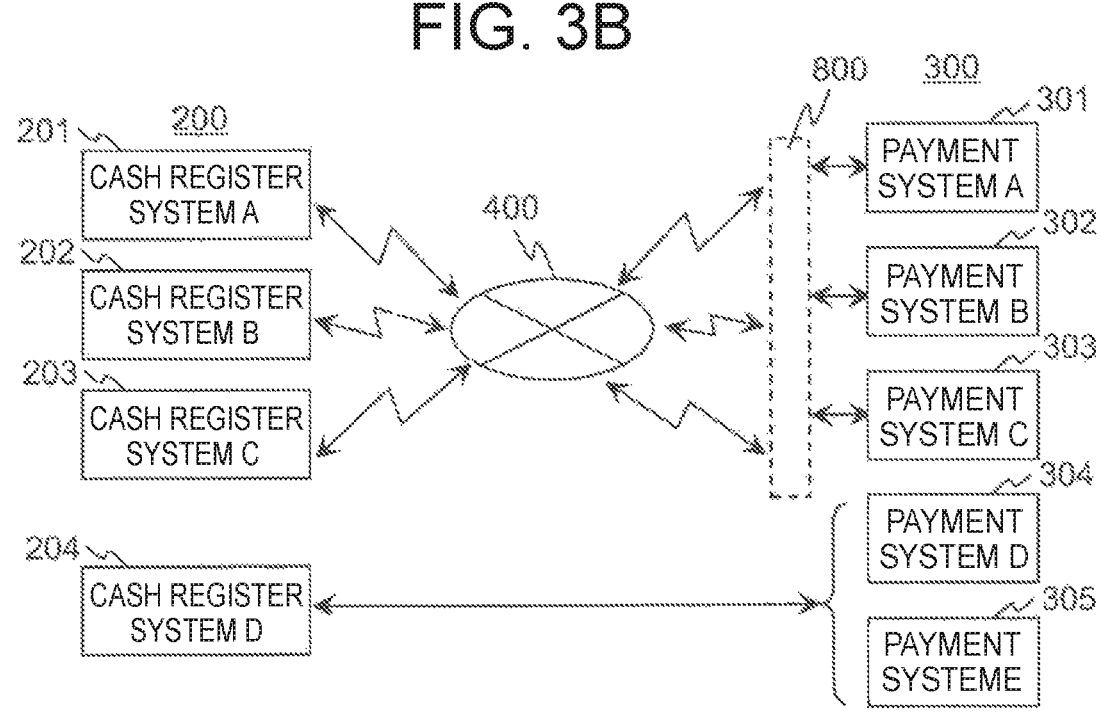
FIG. 3B is an illustrative diagram illustrating a connection relationship of each configuration according to a modification of the embodiment of the present invention.

A system configuration in this case is shown in FIG. 3B.

In this case, the service system 800 manages the card ID 520 that is a part of the account ID 313 and the biometric information (verification face image) 312 in association with each other. When receiving the face image from the cash register system 200, the service system 800 performs authentication.

Figure 16C:
FIG. 16C is an illustrative diagram illustrating an authentication database example according to a modification of the embodiment of the present invention.

An example of an authentication DB 810 managed by the service system 800 is shown in FIG. 16C. As shown in the figure, the authentication DB 810 includes payment company information 811, an account ID 812, and authentication biometric information 813. The payment company information 811 is information for identifying each payment system 300. For example, the company identification number 521 of the card ID is used. In addition, the account ID 812 is information for identifying the account of the customer 101. The account ID 313 of the account DB 310, the customer identification number 522, and so on are used. The authentication biometric information 813 is, for example, a verification face image.

Figure 27:
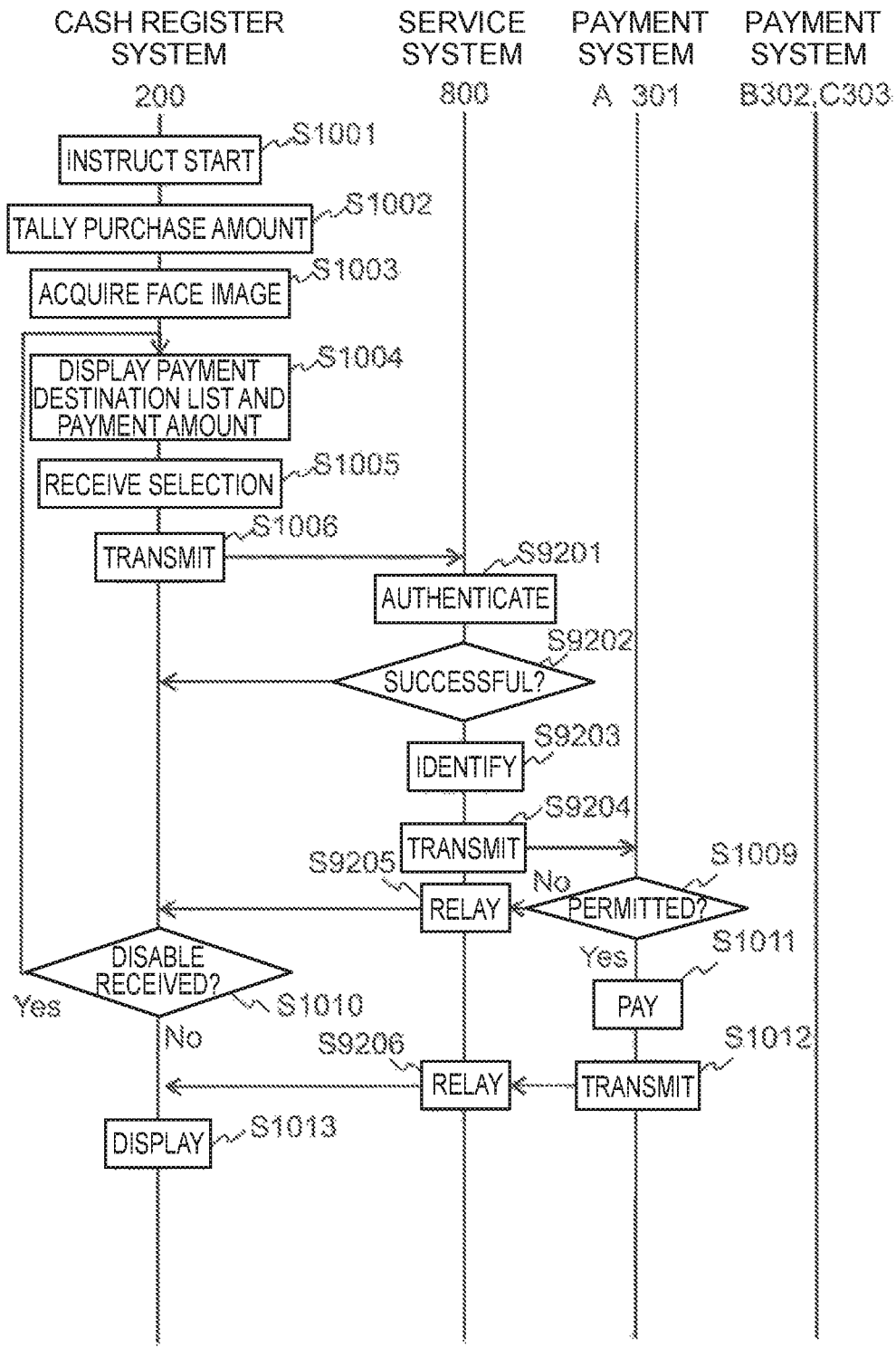
FIG. 27 is a flowchart of a payment process before selection according to another modification of the embodiment of the present invention.

In the case of pre-selection, as shown in FIG. 27, the cash register system 200 transmits the payment amount, the face image, the payment request, and the payment company information to the service system 800 (Step S1006).

In the service system 800, when receiving the face image from the cash register system 200, the authentication is performed by determining whether or not the authentication biometric information 813 that matches the face image is registered in the authentication DB 810 (Step S9201). In this situation, verification is performed in a record associated with the payment company information transmitted together.

If the matched authentication biometric information 813 has been registered, the service system 800 identifies the account ID 812 registered in association with the authentication biometric information 813 (Step S9203). Then, the service system 800 transmits the identified account ID 812, the payment amount, the payment request, and the information (store information) for identifying the cash register system 200 as a transmission source together with the information indicating successful authentication to the payment system 300 identified by the received payment company information (Step S9204). In FIG. 27, it is assumed that the payment system A 301 is selected.

If the matched authentication biometric information 813 has not been registered, the service system 800 returns the information indicating the authentication unsuccessful (Step S9202).

When receiving the payment amount, the payment request, the account ID, and the store information, the payment system A 301 determines whether or not the payment is enabled (Step S1009), and performs the payment if the payment is enabled (Step S1011). Then, the payment system A 301 transmits information indicating completion of payment to the service system 800 of the transmission source (Step S1012). Further, the service system 800 performs a relay for transmitting the information to the cash register system 200 as the transmission source (Step S9206). Incidentally, the service system 800 may be configured to transmit the information indicating the payment completion from the payment system A 301 directly to the store identified by the store information.

On the other hand, if the payment is disabled in Step S1009, the payment system A 301 transmits information indicating the payment disabled to the service system 800 in the same manner as described above, and the service system 800 relays the information to the cash register system of the transmission source (Step S9205).

Figure 28:
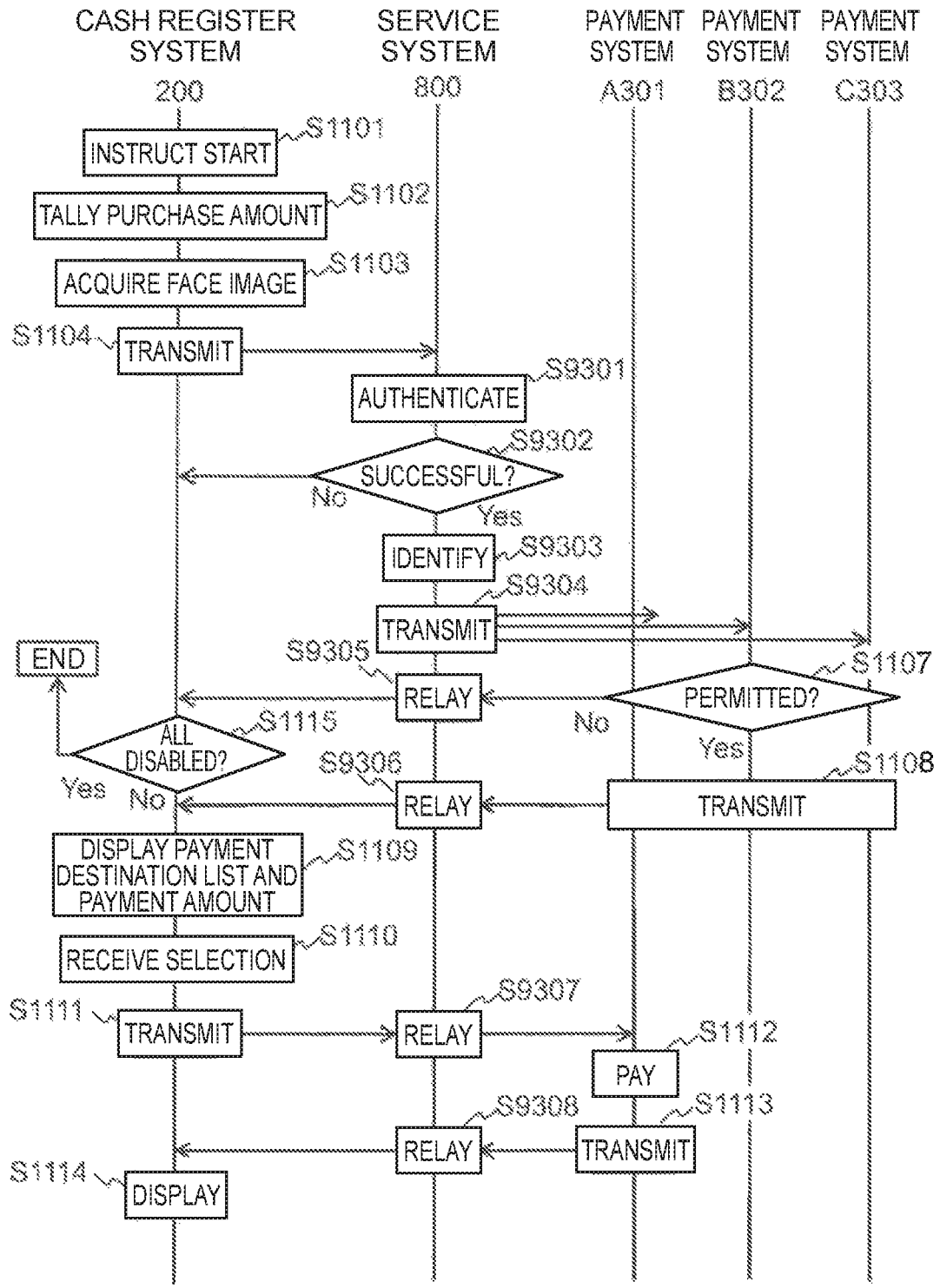
FIG. 28 is a flow chart of a payment process after the selection according to the other modification of the embodiment of the present invention.

On the other hand, a flow in the case of post-selection will be described with reference to FIG. 28. In this case, the cash register system 200 transmits the payment amount and the face image to the service system 800 (Step S1104).

In the service system 800, when receiving the face image from the cash register system 200, it is determined whether or not the authentication biometric information 813 that matches the face image is registered, and the authentication is performed (Step S9301). If the authentication is unsuccessful, the service system 800 returns the fact to the cash register system 200 as a request source (Step S9302).

If the authentication is successful, the service system 800 identifies the payment company information 811 registered in association with the authentication biometric information 813 (Step S9303). Then, the service system 800 transmits the payment amount and the account ID 812 to the payment system 300 of each identified payment company (Step S9304).

The payment system 300 discriminates whether or not the payment is enabled with the use of the transmitted payment amount and the account ID 812 (Step S1107). Then, the payment system 300 transmits the result to the service system 800 of the transmission source (Steps S1107 and S1108).

The service system 800 relays the result to the cash register system 200 as the request source (Steps S9305 and S9306). In this situation, the service system 800 transmits the payment company information 811 together with the payable payment company.

The cash register system 200 creates the payment destination list 512 of the payment system 300 identified by the payment company information 811 returned from the service system 800 (Step S1109), and receives the selection from the customer 101 (Step S1110). Then, the cash register system 200 transmits the payment company information of the selected payment system 300 and the payment request to the service system 800 (Step S1111).

When receiving the payment company information and the payment request as a reply to the authentication success transmitted in advance, the service system 800 relays the payment company information and the payment request to the payment system 300 (Step S9307). In this case, the service system 800 transmits the account ID 812 that has received the payment permission in step S9306 and the information (store information) for identifying the cash register system 200 as the transmission source together. FIG. 28 illustrates a case in which the payment system A 301 is selected.

When receiving the payment amount, the payment request, the account ID 812, and the store information, the payment system A 301 performs the payment (Step S1112) and returns the payment to the service system 800 (Step S1113). The service system 800 relays the return to the cash register system 200 as the request source (Step S9308).

In the case of post-selection, data transmission and reception other than the authentication process may be directly performed between the payment system 300 and the cash register system 200. In that case, the payment system A 301 transmits data to the cash register system 200 of the store identified by the store information, and the cash register system 200 replies to the transmission.

With the configuration described above, biometric information such as a verification face image need not be registered in a plurality of payment systems 300.

Furthermore, the service system 800 described above may further hold priority information of each customer 101. The priority information is information that defines the priority of the usage payment company for each customer 101.

In post-selection of the information, if the payment is permitted by the plurality of payment systems 300 in Step S1108, the service system 800 determines the payment system 300 according to the priority information of the customer. As a result, the process of once returning the information to the cash register system 200 and receiving the selection can be omitted.

The priority information may be held in the mobile terminal 250 of the customer 101, read, and transmitted to the service system 800 together with the payment amount. In the service system 800, the payment system 300 is determined according to the transmitted priority information.

The present invention is not limited to the embodiments and modifications described above. For example, a part of the configuration of a certain embodiment and modification can be replaced with another embodiment and modification. Moreover, a configuration of another embodiment and modification can be added to the configuration of a certain embodiment and modification. Those configurations all belong to the category of the present invention.

Furthermore, numerical values, messages, and the like appearing in sentences and drawings are merely examples, and the use of different ones does not impair the effects of the present invention.

Further, some or all the functions and the like of the invention may be implemented by hardware, for example, by designing with an integrated circuit. Alternatively, some or all the functions and the like of the invention may be implemented by software by allowing a microprocessor unit, a CPU, or the like to interpret and execute an operation program that realizes the respective functions. In addition, an implementation range of software is not limited, but hardware and software may be used in combination.

REFERENCE SIGNS LIST

100: biometric information authentication payment system, 101: customer, 102: clerk, 200: cash register system, 201: store system A, 202: store system B, 203: store system C, 204: store system D, 210: cash register processing section, 211: reception section, 212: transmission section, 213: presentation section, 214: tallying section, 215: amount discrimination section, 216: customer tallying section, 217: identification number DB, 220: POS terminal, 221: product, 230: biometric information acquisition device, 231: camera, 232: second biometric information acquisition device, 233: ID reading device, 234: face image, 234t0: face image, 234t1: face image, 234t2: face image, 235: face image, 240: communication device, 242: NFC device, 243: near field wireless communication device, 244: communication distance, 250: mobile terminal, 250: near terminal, 260: CPU, 261: bus, 262: flash memory, 263: SD-RAM, 264: GPS, 265: first display, 266: external memory IF, 267: external memory, 268: network IF, 269: cash register key, 271: second display, 272: camera, 273: fingerprint sensor, 274: card reader, 275: barcode reader, 277: near field wireless communication IF, 278: wireless LANIF, 290: member store, 300: payment system, 301: payment system, 301: payment system A, 302: payment system B, 303: payment system C, 304: payment system D, 305: payment system E, 310: account DB, 311: account information, 312: biometric information, 312a: verification face image, 312b: update date and time, 313: account ID, 314: personal identification number, 315: customer information, 316: payment amount information, 317: address data, 318: favorite store information, 320: payment processing section, 322: permission section, 323: payment section, 330: authentication section, 331: biometric information, 340: account management section, 351: verification face image, 352: second biometric information, 353: card ID, 390: credit card company, 391: international brand, 392: issuer, 393: acquirer, 400: network, 510: designation reception screen, 511: identification information, 511d: identification information, 512: payment destination list, 513: payment amount, 520: card ID, 521: company identification number, 522: customer identification number, 523: incidental information, 524: payment system ID, 701: home, 701a: home, 701d: home, 702: store, 702a: store, 702b: store, 702c: store, 702d: store, 702e: store, 710: store, 711: camera, 712: inlet, 713: outlet, 714: shelf, 715: payment area, 716: product, 717: shopping basket, 800: service system, 810: authentication DB, 811: payment company information, 812: account ID, 813: biometric information for authentication

The invention claimed is:

1. A payment transaction system comprising a register processing terminal, payment servers, a biometric information acquisition apparatus, a near field wireless communication apparatus, and smartphone,
    wherein the register processing terminal includes:
        first communication circuitry to communicate with the biometric information acquisition apparatus;
        second communication circuitry to communicate with the near field wireless communication apparatus;
        third communication circuitry to communicate with the payment servers via a network;
        a first storage storing pieces of information on credit card companies, each piece being associated with a respective payment server;
        a first touch panel display; and
        a first processor configured to generate a credit card information acquisition request and transmit the credit card information acquisition request to the smartphone via the second communication circuitry,
    wherein each of the payment servers includes:
        fourth communication circuitry to communicate with the register processing terminal via the network;
        a second storage storing registered biometric information, account information, and predetermined payment amount which are associated with a customer; and
        a second processor configured to transmit a response message to the register processing terminal upon receiving of an authentication request from the register processing terminal, via the fourth communication circuitry, and generate the response message which includes information relating to payment permission decided based on at least one of the registered biometric information, the account information, and the predetermined payment amount, which are stored in the second storage,
    wherein the biometric information acquisition apparatus includes:
        fifth communication circuitry to communicate with the register processing terminal, and
        a biometric sensor to sense the customer and generate first biometric information of the customer;
    wherein the near field wireless communication apparatus includes:
        sixth communication circuitry to communicate with the register processing terminal; and
        first near field wireless communication circuitry to communicate with the smartphone,
    wherein the smartphone includes:
        second near field wireless communication circuitry to communicate with the near field wireless communication apparatus;
        a third storage storing a plurality of pieces of credit card information on credit cards owned by the customer, each piece containing credit card company information and user identification information that are related to a respective credit card;
        a second touch panel display; and
        a third processor configured to transmit pieces of the credit card company information upon receiving of the credit card information acquisition request from the register processing terminal, via the second near field wireless communication circuitry, wherein the first processor of the register processing terminal is further configured to:
  acquire the first biometric information from the biometric information acquisition apparatus via the first communication circuitry;
  receive the pieces of the credit card company information which is stored in the third storage of the smartphone, via the second communication circuitry;
  identify pieces of information on credit card companies in the first storage that match pieces of the credit card company information from the smartphone;
  generate the authentication request containing the first biometric information and a payment amount; and
  transmit the authentication request to all payment servers that are associated with the identified pieces of information on credit card companies, and receive response messages respectively from the payment servers, via the third communication circuitry,
wherein the first processor is further configured to:
  display both information related to credit card companies based on the response messages received via the third communication circuitry and information related to the payment amount on the first touch panel display of the register processing terminal; and
  upon receiving of a designation input to the first touch panel display, transmit a payment completion request to one of the payment servers designated by the designation input via the third communication circuitry.

2. The payment transaction system according to claim 1, further comprising a second biometric information acquisition apparatus including:
  seventh communication circuitry to communicate with the register processing terminal, and
  a second biometric sensor to sense the customer and generate second biometric information of the customer different from the first biometric information,
  wherein the register processing terminal further includes eighth communication circuitry to communicate with the second biometric information acquisition apparatus, and
  wherein the first processor is further configured to:
    acquire the second biometric information from the second biometric information acquisition apparatus via the eighth communication circuitry; and
    generate the authentication request containing the first biometric information, the payment amount and the second biometric information when the payment amount is equal to or more than a first threshold.

3. The payment transaction system according to claim 2, wherein the first processor is further configured to generate the authentication request containing the first biometric information, the payment amount, the second biometric information, and the credit card information received from the smartphone via the second communication circuitry, when the payment amount is more than a second threshold which is more than the first threshold, and
wherein the credit card information matches one of the pieces of information on credit card companies that is associated with one of the payment servers to which the generated authentication request is transmitted.

4. The payment transaction system according to claim 1, wherein the first processor is further configured to generate the authentication request containing the first biometric information, the payment amount, and one of the pieces of the credit card information received from the smartphone via the second communication circuitry, and
wherein the one of the pieces of the credit card information matches one of the pieces of information on credit card companies that is associated with one of the payment servers to which the generated authentication request is transmitted.

5. The payment transaction system according to claim 1, wherein the first biometric information generated by the biometric sensor and the registered biometric information are related to a face of the customer.

6. The payment transaction system according to claim 2, wherein the second biometric information generated by the second biometric sensor is relating to a fingerprint of the customer, and
wherein the registered biometric information is further containing the information relating to the fingerprint of the customer.

7. The payment transaction system according to claim 1, wherein both the first near field wireless communication circuitry of the near field wireless communication apparatus and the second near field wireless communication circuitry of the smartphone communicate with each other by radio based on Bluetooth standard.

8. A payment transaction system comprising a register processing terminal, payment servers, a biometric information acquisition apparatus, and smartphone,
  wherein the register processing terminal includes:
    first communication circuitry to communicate with a biometric information acquisition apparatus;
    second communication circuitry to communicate with the payment servers via a network;
    first near field wireless communication circuitry to communicate with the smartphone;
    a first storage storing pieces of information on credit card companies, each piece being associated with a respective payment server;
    a first touch panel display; and
    a first processor configured to generate a credit card information acquisition request and transmit the credit card information acquisition request to the smartphone via the first near field wireless communication circuitry,
  wherein the each of payment servers includes:
    third communication circuitry to communicate with the register processing terminal via the network;
    a second storage storing registered biometric information, account information, and predetermined payment amount which are associated with a customer; and
    a second processor configured to transmit a response message to the register processing terminal upon receiving of an authentication request from the register processing terminal, via the third communication circuitry, and generate the response message which includes information relating to payment permission decided based on at least one of the registered biometric information, the account information, and the predetermined payment amount, which are stored in the second storage,
  wherein the biometric information acquisition apparatus includes:
    fourth communication circuitry to communicate with the register processing terminal; and
    a biometric sensor to sense the customer and generate first biometric information of the customer, wherein the smartphone includes:
second near field wireless communication circuitry to communicate with the register processing terminal;
a third storage storing a plurality of pieces of credit card information on credit cards owned by the customer, each piece containing credit card company information and user identification information that are related to a respective credit card;
a second touch panel display; and
a third processor configured to transmit pieces of the credit card company information upon receiving of the credit card information acquisition request from the register processing terminal, via the second near field wireless communication circuitry,
wherein the first processor of the register processing terminal is further configured to:
acquire the first biometric information from the biometric information acquisition apparatus via the first communication circuitry;
receive the pieces of the credit card company information which is stored in the third storage of the smartphone, via the first near field wireless communication circuitry;
identify pieces of information on credit card companies in the first storage that match pieces of the credit card company information from the smartphone;
generate the authentication request containing the first biometric information and a payment amount; and
transmit the authentication request to all payment servers that are associated with the identified pieces of information on credit card companies, and receive response messages respectively from the payment servers, via the second communication circuitry,
wherein the first processor is further configured to:
display both information related to credit card companies based on the response messages received via the second communication circuitry and information related to the payment amount on the first touch panel display of the register processing terminal; and
upon receiving of a designation input to the first touch panel display, transmit a payment completion request to one of the payment servers designated by the designation input via the second communication circuitry.

9. The payment transaction system according to claim 8, further comprising a second biometric information acquisition apparatus including:
fifth communication circuitry to communicate with the register processing terminal, and
a second biometric sensor to sense the customer and generate second biometric information of the customer different from the first biometric information;
wherein the register processing terminal further includes sixth communication circuitry to communicate with the second biometric information acquisition apparatus, and
wherein the first processor is further configured to:
acquire the second biometric information from the second biometric information acquisition apparatus via the sixth communication circuitry; and
generate the authentication request containing the first biometric information, the payment amount and the second biometric information when the payment amount is equal to or more than a first threshold.

10. The payment transaction system according to claim 9, wherein the first processor is further configured to generate the authentication request containing the first biometric information, the payment amount, the second biometric information, and the credit card information received from the smartphone via the first near field wireless communication circuitry, when the payment amount is more than a second threshold which is more than the first threshold, and
wherein the credit card information matches one of the pieces of information on credit card companies that is associated with one of the payment servers to which the generated authentication request is transmitted.

11. The payment transaction system according to claim 8, wherein the first processor is further configured to generate the authentication request containing the first biometric information, the payment amount, and one of the pieces of the credit card information received from the smartphone via the first near field wireless communication circuitry, and
wherein the one of the pieces of the credit card information matches one of the pieces of information on credit card companies that is associated with one of the payment servers to which the generated authentication request is transmitted.

12. The payment transaction system according to claim 8, wherein the first biometric information generated by the biometric sensor and the registered biometric information are relating to a face of the customer.

13. The payment transaction system according to claim 9, wherein the second biometric information generated by the second biometric sensor is relating to a fingerprint of the customer, and
wherein the registered biometric information is further containing the information relating to the fingerprint of the customer.

14. The payment transaction system according to claim 8, wherein both the first near field wireless communication circuitry of the register processing terminal and the second near field wireless communication circuitry of the smartphone communicate with each other by radio based on Bluetooth standard.

15. A payment transaction system comprising a register processing terminal, payment servers, a biometric information acquisition apparatus, and smartphone,
wherein the register processing terminal includes:
first communication means for communicating with a biometric information acquisition apparatus;
second communication means for communicating with the payment servers via a network;
first near field wireless communication means for communicating with the smartphone;
first storage means for storing pieces of information on credit card companies, each piece being associated with a respective payment server;
first touch function display means; and
first processing means for generating a credit card information acquisition request and transmit the credit card information acquisition request to the smartphone via the first near field wireless communication means,
wherein the each of payment servers includes:
third communication means for communicating with the register processing terminal via the network;
second storage means for storing registered biometric information, account information, and predetermined payment amount which are associated with a customer; and
second processing means for transmitting a response message to the register processing terminal upon receiving of an authentication request from the register processing terminal, via the third communication means, and generate the response message which includes information relating to payment permission decided based on at least one of the registered biometric information, the account information, and the predetermined payment amount, which are stored in the second storage, wherein the biometric information acquisition apparatus includes:
fourth communication means for communicating with the register processing terminal; and
biometric sensing means for sensing the customer and generating first biometric information of the customer, wherein the smartphone includes:
second near field wireless communication means for communicating with the register processing terminal;
third storage means for storing a plurality of pieces of credit card information on credit cards owned by the customer, each piece containing credit card company information and user identification information that are related to a respective credit card;
second touch function display means; and
third processing means for transmitting pieces of the credit card company information upon receiving of the credit card information acquisition request from the register processing terminal, via the second near field wireless communication means, wherein the first processing means of the register processing terminal is further configured to:
acquire the first biometric information from the biometric information acquisition apparatus via the first communication circuitry;
receive the pieces of the credit card company information which is stored in the third storage of the smartphone, via the first near field wireless communication means;
identify pieces of information on credit card companies in the first storage means that match pieces of the credit card company information from the smartphone;
generate the authentication request containing the first biometric information and a payment amount; and
transmit the authentication request to all payment servers that are associated with the identified pieces of information on credit card companies, and receive response messages respectively from the payment servers, via the second communication means, wherein the first processing means is further configured to:
display both information related to credit card companies based on the response messages received via the second communication circuitry and information related to the payment amount on the first touch function displaying means of the register processing terminal; and
upon receiving of a designation input to the first touch function displaying means, transmit a payment completion request to one of the payment servers designated by the designation input via the second communication means.

16. The payment transaction system according to claim 15, further comprising a second biometric information acquisition apparatus including:
fifth communication means for communicating with the register processing terminal, and
second biometric sensing means for sensing the customer and generating second biometric information of the customer different from the first biometric information;

wherein the register processing terminal further includes sixth communication means for communicating with the second biometric information acquisition apparatus, and wherein the first processing means is further configured to:
acquire the second biometric information from the second biometric information acquisition apparatus via the sixth communication means; and
generate the authentication request containing the first biometric information, the payment amount and the second biometric information when the payment amount is equal to or more than a first threshold.

17. The payment transaction system according to claim 16,
wherein the first processing means is further configured to generate the authentication request containing the first biometric information, the payment amount, the second biometric information, and the credit card information received from the smartphone via the first near field wireless communication means, when the payment amount is more than a second threshold which is more than the first threshold, and
wherein the credit card information matches one of the pieces of information on credit card companies that is associated with one of the payment servers to which the generated authentication request is transmitted.

18. The payment transaction system according to claim 15,
wherein the first processing means is further configured to generate the authentication request containing the first biometric information, the payment amount, and one of the pieces of the credit card information received from the smartphone via the first near field wireless communication means, and
wherein the one of the pieces of the credit card information matches one of the pieces of information on credit card companies that is associated with one of the payment servers to which the generated authentication request is transmitted.

19. The payment transaction system according to claim 15, wherein the first biometric information generated by the biometric sensing means and the registered biometric information are relating to a face of the customer.

20. The payment transaction system according to claim 15, wherein both the first near field wireless communication means of the register processing terminal and the second near field wireless communication circuitry of the smartphone communicate with each other by radio based on Bluetooth standard.

* * * * *